(12) United States Patent
Shin

(10) Patent No.: US 10,412,379 B2
(45) Date of Patent: Sep. 10, 2019

(54) IMAGE DISPLAY APPARATUS HAVING LIVE VIEW MODE AND VIRTUAL REALITY MODE AND OPERATING METHOD THEREOF

(71) Applicant: SAMSUNG ELECTRONICS CO., LTD., Suwon-si (KR)

(72) Inventor: Hyung-jong Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 15/680,412

(22) Filed: Aug. 18, 2017

(65) Prior Publication Data

US 2018/0054611 A1 Feb. 22, 2018

(30) Foreign Application Priority Data

Aug. 22, 2016 (KR) .................. 10-2016-0106179

(51) Int. Cl.
*H04N 5/232* (2006.01)
*H04N 13/359* (2018.01)
(Continued)

(52) U.S. Cl.
CPC ......... *H04N 13/359* (2018.05); *G02B 27/017* (2013.01); *G06F 1/163* (2013.01); *G06F 1/1686* (2013.01); *G06F 1/1694* (2013.01); *G06F 3/011* (2013.01); *G06F 3/012* (2013.01); *G06F 3/017* (2013.01); *G06F 3/0304* (2013.01); *G06F 3/167* (2013.01); *H04N 5/23293* (2013.01); *H04N 13/344* (2018.05); *G02B 2027/0118* (2013.01); *G02B 2027/0138* (2013.01);
(Continued)

(58) Field of Classification Search
CPC .............. H04N 13/359; H04N 13/344; H04N 5/23293; H04N 5/23238; H04N 2213/007; G02B 27/017; G02B 2027/0138; G02B 2027/0187; G02B 2027/0118; G06F 3/012; G06F 3/167
USPC .......................................... 348/51
See application file for complete search history.

(56) References Cited

U.S. PATENT DOCUMENTS 5,900,849 A    5/1999  Gallery
6,088,006 A *  7/2000  Tabata ................. H04N 13/275
                                             345/7

(Continued)

FOREIGN PATENT DOCUMENTS

KR    10-2015-0141461 A    12/2015

OTHER PUBLICATIONS

Oliveira et al, Experiencing guidance in 3D spaces with a vibrotactile head-mounted display (Year: 2017).*

(Continued)

*Primary Examiner* — Shan E Elahi
(74) *Attorney, Agent, or Firm* — Sughrue Mion, PLLC

(57) ABSTRACT

An image display apparatus includes a sensor configured to sense an external force applied to the image display apparatus; a memory configured to store at least one instruction; and a processor configured to execute the at least one instruction stored in the memory to activate the imaging device and control the display to display an external image captured by the imaging device in response to the external force being sensed while the image display apparatus is operating in a virtual reality mode of displaying a 360° image.

20 Claims, 19 Drawing Sheets

(51) Int. Cl.
*H04N 13/344* (2018.01)
*G06F 3/01* (2006.01)
*G06F 3/16* (2006.01)
*G02B 27/01* (2006.01)
*G06F 1/16* (2006.01)
*G06F 3/03* (2006.01)

(52) U.S. Cl.
CPC .. *G02B 2027/0187* (2013.01); *H04N 5/23238* (2013.01); *H04N 2213/007* (2013.01)

(56) References Cited

U.S. PATENT DOCUMENTS

| | | | | |
|---|---|---|---|---|
| 6,507,359 | B1* | 1/2003 | Muramoto | H04N 5/772 348/47 |
| 8,576,276 | B2* | 11/2013 | Bar-Zeev | G02B 27/017 345/8 |
| 10,123,434 | B2* | 11/2018 | Yun | G02B 27/022 |
| 2012/0050143 | A1 | 3/2012 | Border et al. | |
| 2012/0127284 | A1* | 5/2012 | Bar-Zeev | G02B 27/017 348/53 |
| 2013/0278631 | A1* | 10/2013 | Border | G02B 27/017 345/633 |
| 2015/0072618 | A1* | 3/2015 | Granbery | H04W 4/21 455/41.2 |
| 2015/0177957 | A1* | 6/2015 | Bae | G06F 3/04842 715/835 |
| 2015/0355709 | A1 | 12/2015 | Lee et al. | |
| 2016/0025978 | A1 | 1/2016 | Mallinson | |
| 2016/0026253 | A1* | 1/2016 | Bradski | G02B 27/225 345/8 |
| 2016/0027212 | A1 | 1/2016 | Da Veiga et al. | |
| 2016/0077651 | A1 | 3/2016 | Na et al. | |
| 2016/0216792 | A1 | 7/2016 | Ogawa et al. | |
| 2017/0061700 | A1* | 3/2017 | Urbach | H04N 13/344 |
| 2017/0094816 | A1* | 3/2017 | Yun | G02B 27/022 |

OTHER PUBLICATIONS

Kijima et a, False image projector for head mounted display using retrotransmissive optical system (Year: 2009).*

Search Report and Written Opinion dated Nov. 23, 2017, issued by the International Searching Authority in counterpart International Patent Application No. PCT/KR2017/008739 (PCT/ISA/210 and PCT/ISA/237).

Communication dated Jul. 8, 2019, from the European Patent Office in counterpart European Application No. 17843859.4.

* cited by examiner

FIG. 4
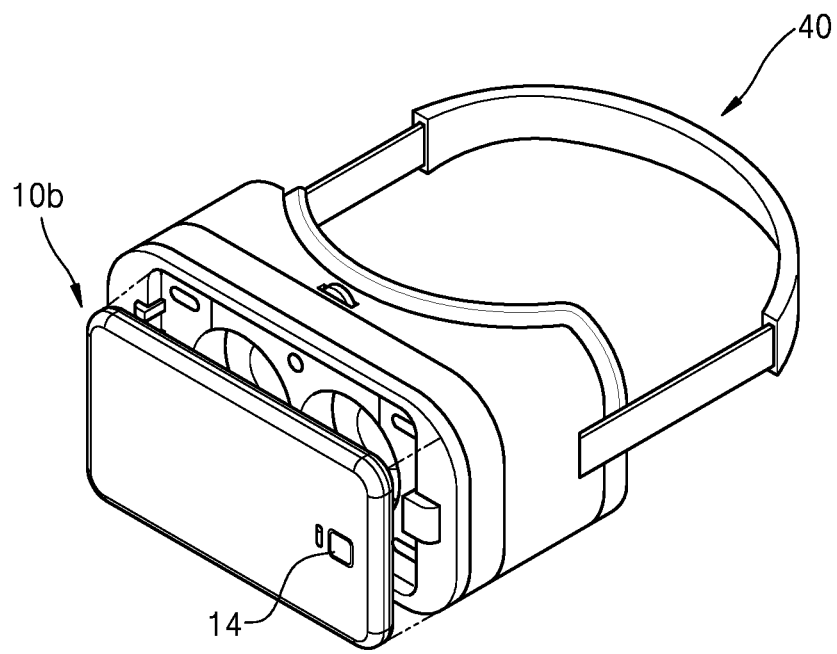
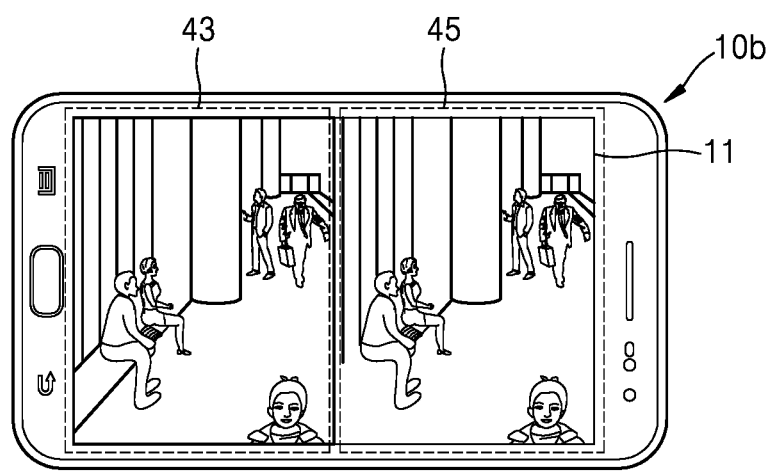

FIG. 7
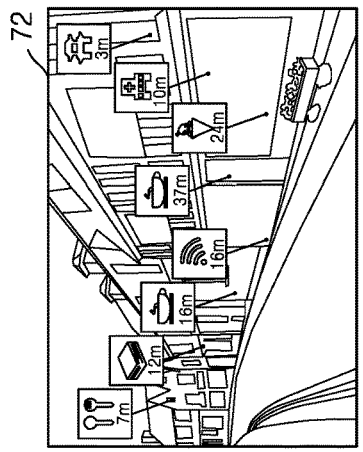
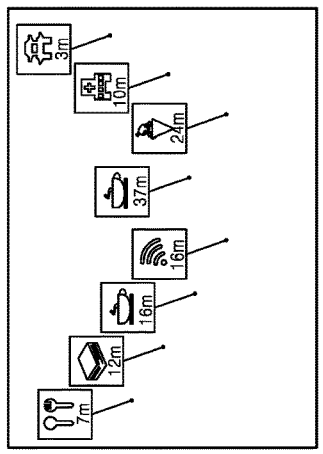
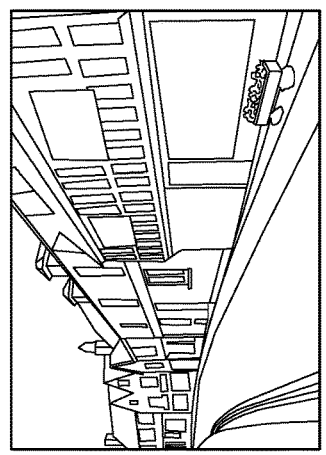

IMAGE DISPLAY APPARATUS HAVING LIVE VIEW MODE AND VIRTUAL REALITY MODE AND OPERATING METHOD THEREOF

CROSS-REFERENCE TO RELATED APPLICATION

This application claims priority from Korean Patent Application No. 10-2016-0106179, filed on Aug. 22, 2016, in the Korean Intellectual Property Office, the disclosure of which is incorporated herein by reference in its entirety.

BACKGROUND

1. Field

Apparatuses and methods consistent with exemplary embodiments relate to an image display apparatus capable of displaying a 360° virtual reality image and an external image, and an operating method of the image display apparatus.

2. Description of the Related Art

An image display apparatus may provide a user with various types of video content.

Recently, the image display apparatus has been realized in a wearable form to display an image having different angles of view according to a user's movement. As such, the image display apparatus can reproduce a 360° image and thus allows the user to experience a virtual reality scene. However, while the user is wearing the image display apparatus, the user can injure him/herself because the image display apparatus may occupy the user's entire visual field.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide an image display apparatus capable of changing an operation mode when sensing that a force is applied thereto and a method of operating the image display apparatus.

According to an aspect of an exemplary embodiment, there is provided an image display apparatus including: an imaging device; a display; a sensor configured to sense an external force applied to the image display apparatus; a memory configured to store at least one instruction; and a processor configured to execute the at least one instruction to activate the imaging device and control the display to display an external image captured by the imaging device in response to the external force being sensed while the image display apparatus is operating in a virtual reality mode of displaying a 360° image.

The processor may be further configured to execute the at least one instruction to change to the virtual reality mode in response to the external force being sensed while the image display apparatus is operating in a live-view mode of displaying the external image.

The sensor may be further configured to sense the external force by sensing a first hit applied to the image display apparatus and sensing a second hit applied to the image display apparatus within a pre-set period of time after the first hit is sensed.

The processor may be further configured to activate a voice recognition function to receive voice from a user in response to the external force being sensed, and activate the imaging device in response to the voice being received from the user.

The sensor may be further configured to measure a movement speed of the image display apparatus, and the processor may be configured to compare a threshold value with a change of the movement speed to determine whether the external force is applied to the image display apparatus.

The processor may be further configured to execute the at least one instruction to add to the external image a still image or video related to at least one object included in the external image, and control the display to display the external image to which the still image or video has been added.

The processor may be further configured to execute the at least one instruction to: divide each of the 360° image and the external image into a left eye image and a right eye image; and control the display to divide a screen of the display into a first sub-screen and a second sub-screen, to display the left eye image of the 360° image and the left eye image of the external image on the first sub-screen, and to display the right eye image of the 360° image and the right eye image of the external image on the second sub-screen.

The processor may be further configured to control the display to adjust brightness of the external image based on brightness of the 360° image.

The brightness of the external image may be adjusted to be gradually close to original brightness of the external image at pre-set time intervals.

The processor may be further configured to execute the at least one instruction to generate a sphere-shaped 360° image by mapping the 360° image to a sphere, to extract a partial region of the sphere-shaped 360° image based on a movement of the image display apparatus, and to control the display to display the extracted partial region.

The image display apparatus may further include a graphic processing unit (GPU) configured to warp the extracted partial region, wherein the processor may be further configured to control the display to display the partial region warped by the GPU.

According to an aspect of another exemplary embodiment, there is provided an operating method of an image display apparatus including: sensing an external force applied to the image display apparatus while the image display apparatus is operating in a virtual reality mode of displaying a 360° image; activating an imaging device in response to the external force being sensed; and displaying an external image that is captured by the imaging device in response to the external force being sensed.

The operating method may further include: sensing the external force while the image display apparatus is operating in a live-view mode of displaying the external image; and changing the live-view mode to the virtual reality mode in response to the external force being sensed.

The sensing the external force may include: sensing a first hit applied to the image display apparatus; and sensing a second hit applied to the image display apparatus within a pre-set period of time after the first hit is sensed.

The activating the imaging device may include: activating a voice recognition function in response to the external force being sensed; receiving voice from a user of the image display apparatus; and activating the imaging device in response to the voice received from the user.

The sensing the external force may include: measuring a movement speed of the image display apparatus; and comparing a threshold value with a change of the measured movement speed to determine whether the external force is applied to the image display apparatus.

The displaying the external image may include: adding, to the external image, an image related to at least one object included in the external image; and displaying the external image to which the image has been added.

The displaying the external image may include: displaying the external image after adjusting brightness of the external image based on brightness of the 360° image; and displaying the external image after adjusting the brightness of the external image to be gradually close to original brightness of the external image.

The operating in the virtual reality mode of displaying the 360° image may include: generating a sphere-shaped 360° image by mapping the 360° image to a sphere; and displaying a partial region of the sphere-shaped 360° image based on a movement of the image display apparatus.

According to an aspect of another exemplary embodiment, there is provided a non-transitory computer-readable storage medium storing a program that is executable by a computer to perform the operating method of an image display apparatus.

According to an aspect of another exemplary embodiment, there is provided a method for changing a view mode, the method including: receiving an input indicating that a human touch is made to an image display apparatus while the image display apparatus is operating in a virtual reality mode; determining a strength of the human touch based on a movement of the image display apparatus that occurs when the human touch is made; and activating an imaging device to capture and display an external image in response to the strength of the human touch is greater than a threshold value.

The method may further include: in response to a difference between a brightness level of a virtual reality image which has been reproduced in the virtual reality mode and a brightness level of the external image which is to be reproduced is greater than or equal to a predetermined value, adjusting the brightness level of the external image to reduce the difference to be less than the predetermined value.

BRIEF DESCRIPTION OF THE DRAWINGS

The above and/or other aspects will be more apparent by describing certain exemplary embodiments, with reference to the accompanying drawings, in which:

FIG. 4 is a diagram of an image display apparatus according to another exemplary embodiment;

FIG. 7 is a diagram for describing an operation of a controller in a live-view mode, according to an exemplary embodiment;

DETAILED DESCRIPTION

Figure 1:
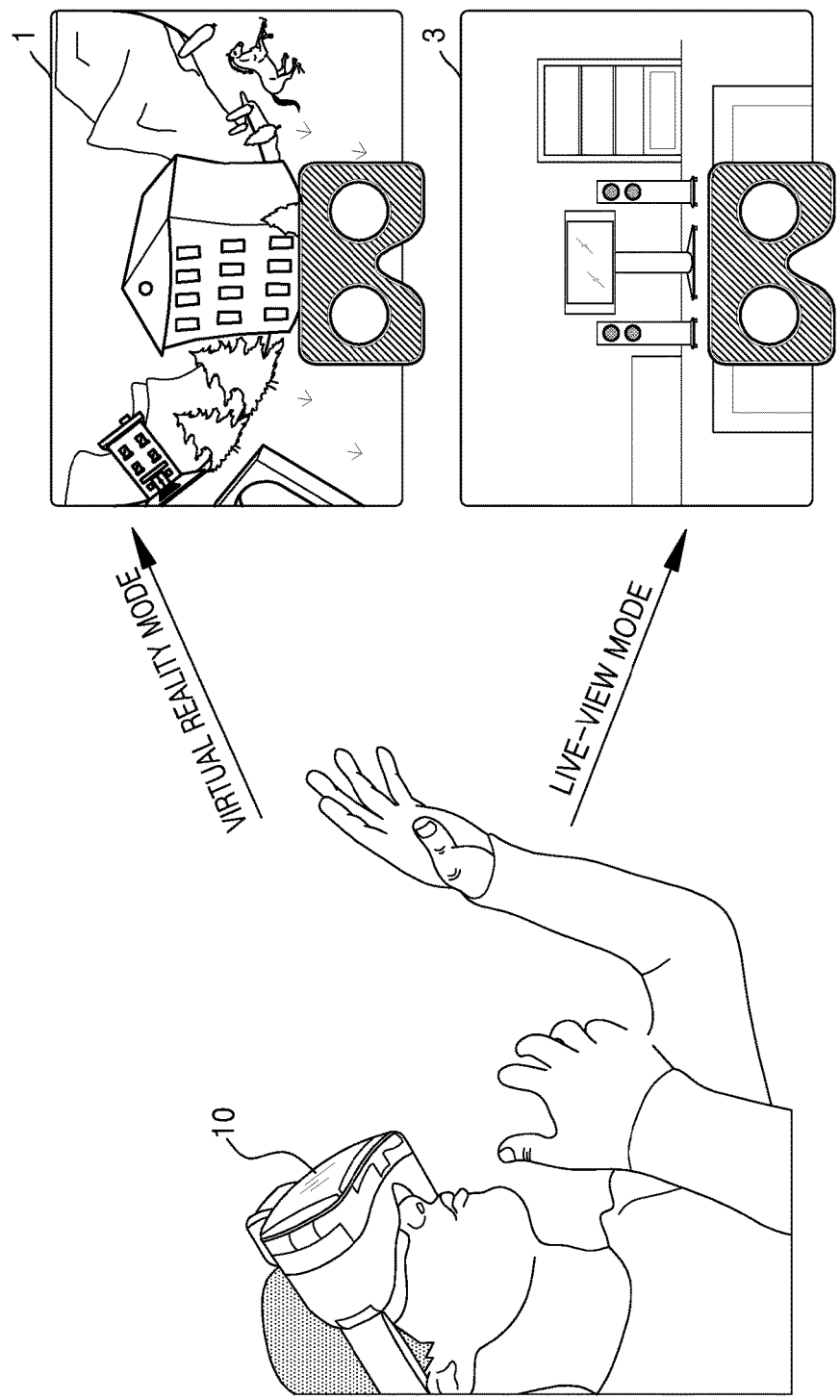
FIG. 1 is a schematic diagram for describing an image display apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

It will be understood that although the terms first and second are used herein to describe various elements, these elements should not be limited by these terms. These terms are only used to distinguish one element from another element. Thus, a first element discussed below could be termed a second element, and similarly, a second element may be termed a first element without departing from the teachings of this disclosure. As used herein, the term "and/or" includes any and all combinations of one or more of the associated listed items. Expressions such as "at least one of", when preceding a list of elements, modify the entire list of elements and do not modify the individual elements of the list.

When a part "includes" or "comprises" an element, unless there is a particular description contrary thereto, the part can further include other elements, not excluding the other elements. Also, the term "unit" in the embodiments of the present disclosure means a software component or hardware component such as a field-programmable gate array (FPGA)

or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

FIG. 1 is a schematic diagram for describing an image display apparatus 10 according to an exemplary embodiment.

Referring to FIG. 1, the image display apparatus 10 according to an exemplary embodiment may operate in a virtual reality mode of displaying a 360° image 1. The 360° image 1 may be an image having a 360° angle of view. For example, the 360° image 1 may be generated by connecting at least one image captured in a 360° direction by using at least one camera. Also, the 360° image 1 may be a 3-dimensional (3D) image.

The image display apparatus 10 may extract and display a partial image of the 360° image according to a user's movement. For example, the image display apparatus 10 may be a head-mounted display (HMD) apparatus worn by a user and may extract and display a partial image of the 360° image 1 according to a direction in which the user is looking.

The image display apparatus 10 may also be any one of various portable apparatuses, such as a mobile phone, a smart phone, a tablet personal computer (PC), a digital camera, a camcorder, a laptop computer, a desktop computer, an electronic book terminal, a digital broadcasting terminal, a personal digital assistant (PDA), and a portable multimedia player (PMP). The image display apparatus 10 may be combined with a headset apparatus to be worn on the body by the user. According to another exemplary embodiment, the image display apparatus 10 may be part of a virtual reality headset.

The image display apparatus 10 may operate in a live-view mode of displaying an external image 3 captured by an imaging device. In the live-view mode, the image display apparatus 10 may allow the user to see what an image sensor or a camera lens of the image display apparatus 10 is seeing. The external image 3 may be, for example, a real-time image, an instant view image, or a live-view image. Also, in the live-view mode, the image display apparatus 10 may provide an augmented reality image by additionally displaying on the external image 3 an image related to at least one object included in the external image 3.

The user of the image display apparatus 10 may not be able to recognize the user's surroundings while wearing the image display apparatus 10 if the image display apparatus 10 is operating in the virtual reality mode of displaying the 360° image. Accordingly, when a sudden external impact or a change of the user's environment is detected, the user may want to immediately change the virtual reality mode to the live-view mode. Hereinafter, an operation of the image display apparatus 10 for immediately changing an operation mode will be described.

Figure 2:
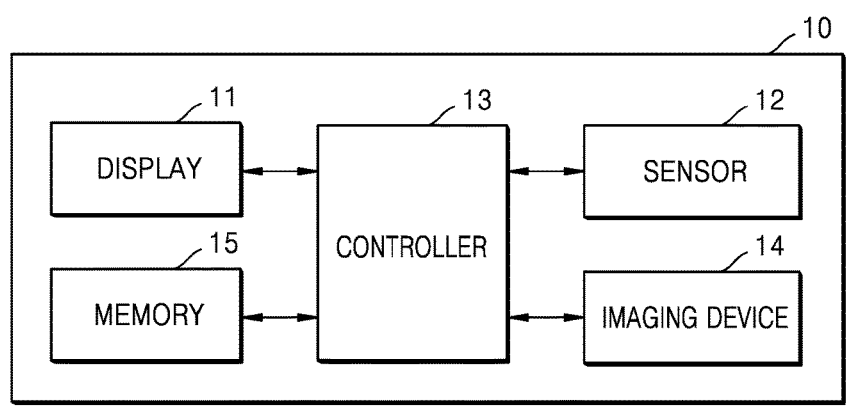
FIG. 2 is a block diagram of a structure of an image display apparatus, according to an exemplary embodiment.

FIG. 2 is a block diagram of a structure of the image display apparatus 10, according to an exemplary embodiment.

Referring to FIG. 2, the image display apparatus 10 includes a display 11, a sensor 12, a controller 13, an imaging device 14, and a memory 15.

The display 11 receives an image signal processed by the controller 13 and outputs the image signal to a display region. The display 11 may be a plasma display panel (PDP), a liquid crystal display (LCD), an organic light-emitting display (OLED), a flexible display, or a transparent display, or may be a 3D display. However, the display 11 is not limited thereto, and may be another type of display device.

The display 11 according to an exemplary embodiment may output a partial region of a 360° image, according to control of the controller 13. Also, the display 11 may output an external image captured by the imaging device 14, according to control of the controller 13.

The sensor 12 senses a force applied to the image display apparatus 10. The sensor 12 may be at least one of an acceleration sensor, a gyroscope sensor, and a position sensor (e.g., a global positioning system (GPS)).

According to an exemplary embodiment, the sensor 12 may sense the force applied to the image display apparatus 10 by comparing a threshold value with a value sensed by the at least one sensor.

For example, the sensor 12 may sense information about a movement speed of the image display apparatus 10 via the acceleration sensor. The sensor 12 may determine that the force is applied to the image display apparatus 10 when the movement speed sensed by the acceleration sensor is changed to be greater than or equal to a first threshold value. The movement speed may indicate a strength of the force applied to the image display apparatus 10.

Alternatively, the sensor 12 may sense information about an azimuth of the image display apparatus 10 via the gyroscope sensor. In particular, the sensor 12 may determine that the force is applied to the image display apparatus 10 when the azimuth sensed by the gyroscope sensor is changed to be greater than or equal to a second threshold value. Also, the sensor 12 may inform the controller 13 about the sensing of the force applied to the image display apparatus 10.

The sensor 12 according to an exemplary embodiment may sense the information about the movement speed or azimuth of the image display apparatus 10 and provide a sensed value to the controller 13. In particular, the controller 13 may determine whether the force is applied to the image display apparatus 10 by comparing the threshold value with the provided value.

The controller 13 may include at least one processor to control overall operations of the image display apparatus 10 by executing at least one instruction stored in the memory 15.

According to an exemplary embodiment, the controller 13 may operate in any one of various operation modes. For example, the controller 13 may operate in a virtual reality mode or a live-view mode. In the virtual reality mode, the controller 13 may process an image signal corresponding to a 360° image stored in the memory 15 and input the image signal to the display 11. In the live-view mode, the controller 13 may activate the imaging device 14 to process an image signal corresponding to an external image captured by the imaging device 14 and input the image signal to the display 11. The external image may include a scene that the sensor 12 is currently seeing through an optical lens. Also, in the live-view mode, the controller 13 may generate an augmented reality image by adding at least one image or video to the external image, process an image signal corresponding to the augmented reality image, and input the image signal to the display 11. Operations of the controller 13 in the virtual reality mode or the live-view mode will be described with reference to FIGS. 5 through 8.

According to an exemplary embodiment, the controller 13 may change the operation mode from the virtual reality mode to the live-view mode in response to a value input from the sensor 12. Also, the controller 13 may change the operation mode from the live-view mode to the virtual reality mode when a force applied to the image display apparatus 10 is sensed.

For example, the controller 13 may change the operation mode in response to the sensing of the force continuously applied to the image display apparatus 10 by the sensor 12. In other words, the user may continuously tap the image display apparatus 10 to easily change the operation mode.

Alternatively, the controller 13 may change the operation mode based on strength of the force applied to the image display apparatus 10. For example, the controller 13 may change the operation mode when the strength of the force applied to the image display apparatus 10 is greater than or equal to a third threshold value. The strength of force applied to the image display apparatus 10 may be determined according to a degree of change of the movement speed or azimuth of the image display apparatus 10, which is measured by the sensor 12. Accordingly, when an impact of certain strength or greater is applied to the image display apparatus 10, the controller 13 may change the virtual reality mode to the live-view mode such that the user may immediately recognize an outside situation.

The imaging device 14 may include a lens and at least one image sensor. The imaging device 14 may provide the controller 13 with image data obtained by photographing a field of view of the lens. The controller 13 may generate the external image from the image data received from the imaging device 14. The imaging device 14 may also be referred to as a camera.

According to an exemplary embodiment, the imaging device 14 may be activated by the controller 13 when the image display apparatus 10 is operating in the live-view mode. Also, the imaging device 14 may be deactivated by the controller 13, when the image display apparatus 10 is operating in the virtual reality mode.

The memory 15 may be connected to the controller 13 to provide various commands to the controller 13. Also, the memory 15 may temporarily or continuously store information processed by the controller 13.

According to an exemplary embodiment, the memory 15 may store the 360° image. Also, the memory 15 may store the external image captured by the imaging device 14 and/or the image or video added to the external image.

The memory 15 may be implemented in various types, such as a flash memory type, a hard disk type, a multimedia card micro type, a card type (e.g., secure digital (SD) or extreme digital (XD) memory type), a magnetic memory type, a magnetic disk type, and an optical disk type, but is not limited thereto and may be another type of memory device.

As disclosed above according to an exemplary embodiment, the controller 13 controls to display the augmented reality image in the live-view mode, but alternatively, the controller 13 may classify the live-view mode of displaying the external image and an augmented reality mode of displaying the augmented reality image. In particular, the controller 13 may change the operating mode of the image display apparatus 10 to the live-view mode in response to the sensing of the force applied to the image display apparatus 10 while the image display apparatus 10 is operating in the virtual reality mode, and may change the operating mode of the image display apparatus 10 to the augmented reality mode in response to the sensing of the force applied to the image display apparatus 10 while the image display apparatus 10 is operating in the live-view mode. In addition, the controller 13 may change the operating mode of the image display apparatus 10 to the augmented reality mode in response to the sensing of the force applied to the image display apparatus 10 while the image display apparatus 10 is operating in the virtual reality mode, and may change the operating mode of the image display apparatus 10 to the live-view mode in response to the sensing of the force applied to the image display apparatus 10 while the image display apparatus 10 is operating in the augmented reality mode.

As described with reference to FIG. 1, the user may wear or take off the image display apparatus 10. When the user takes off the image display apparatus 10, the controller 13 may not change the operation mode of the image display apparatus 10 even when the sensor 12 senses the force applied to the image display apparatus 10 while the image display apparatus 10 is operating in the virtual reality mode. For example, the controller 13 may determine whether the image display apparatus 10 is worn by the user and may activate a switching operation to change the operation modes among the virtual reality mode, the augmented reality mode, and the live-view mode only in response to determining the image display apparatus 10 is worn by the users.

Also, the controller 13 according to an exemplary embodiment may not change the operation mode of the image display apparatus 10 even when the force is applied to the image display apparatus 10, when the image display apparatus 10 is in an operation mode other than the virtual reality mode and the live-view mode (according to an exemplary embodiment, including the augmented reality mode). For example, the image display apparatus 10 may not change the operation mode thereof even when the force applied to the image display apparatus 10 is sensed, when the image display apparatus 10 is operating in a configuration setting mode of setting a configuration.

Figure 3A:
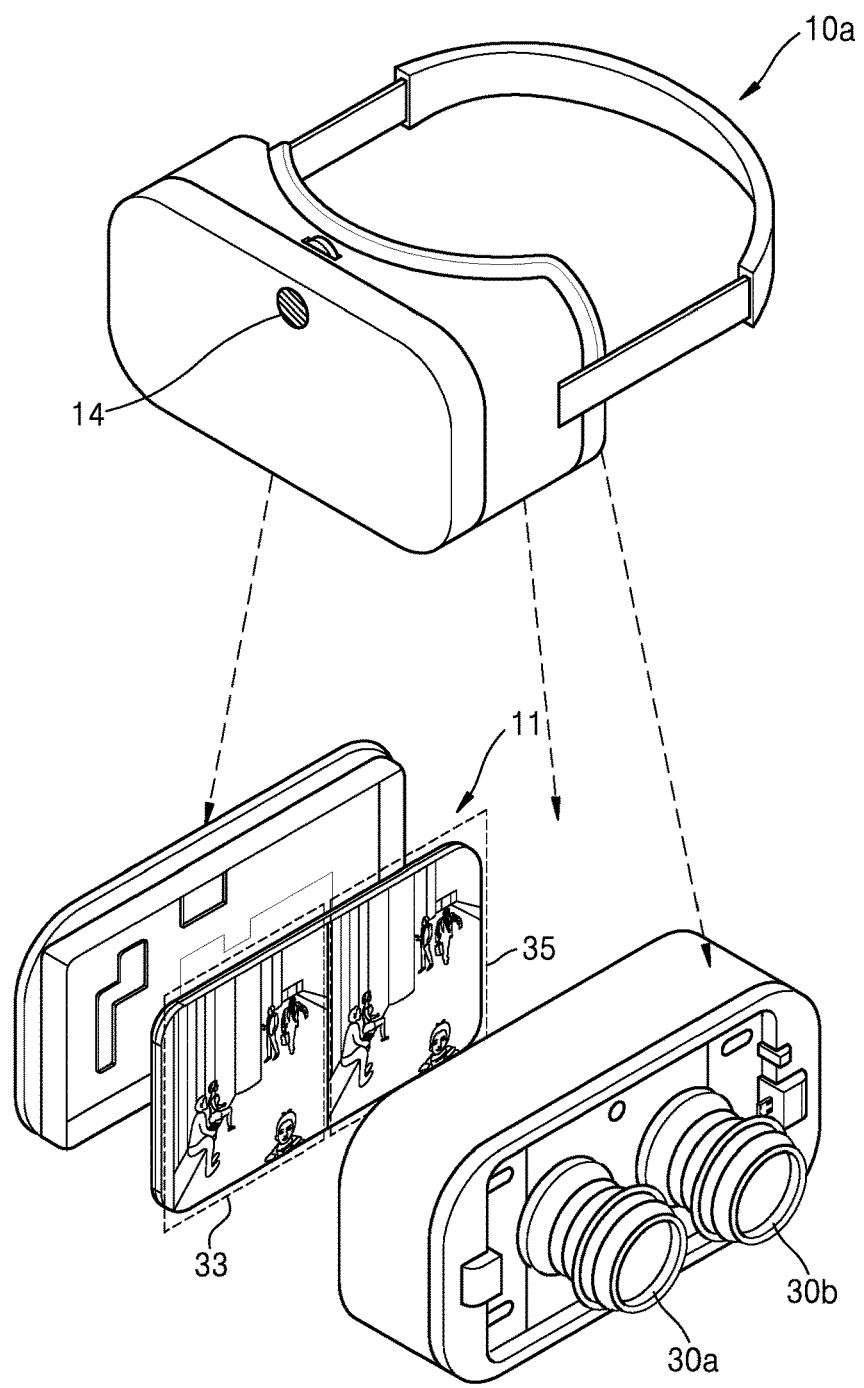
FIGS. 3A and 3B are diagrams of an image display apparatus according to an exemplary embodiment.
Figure 3B:
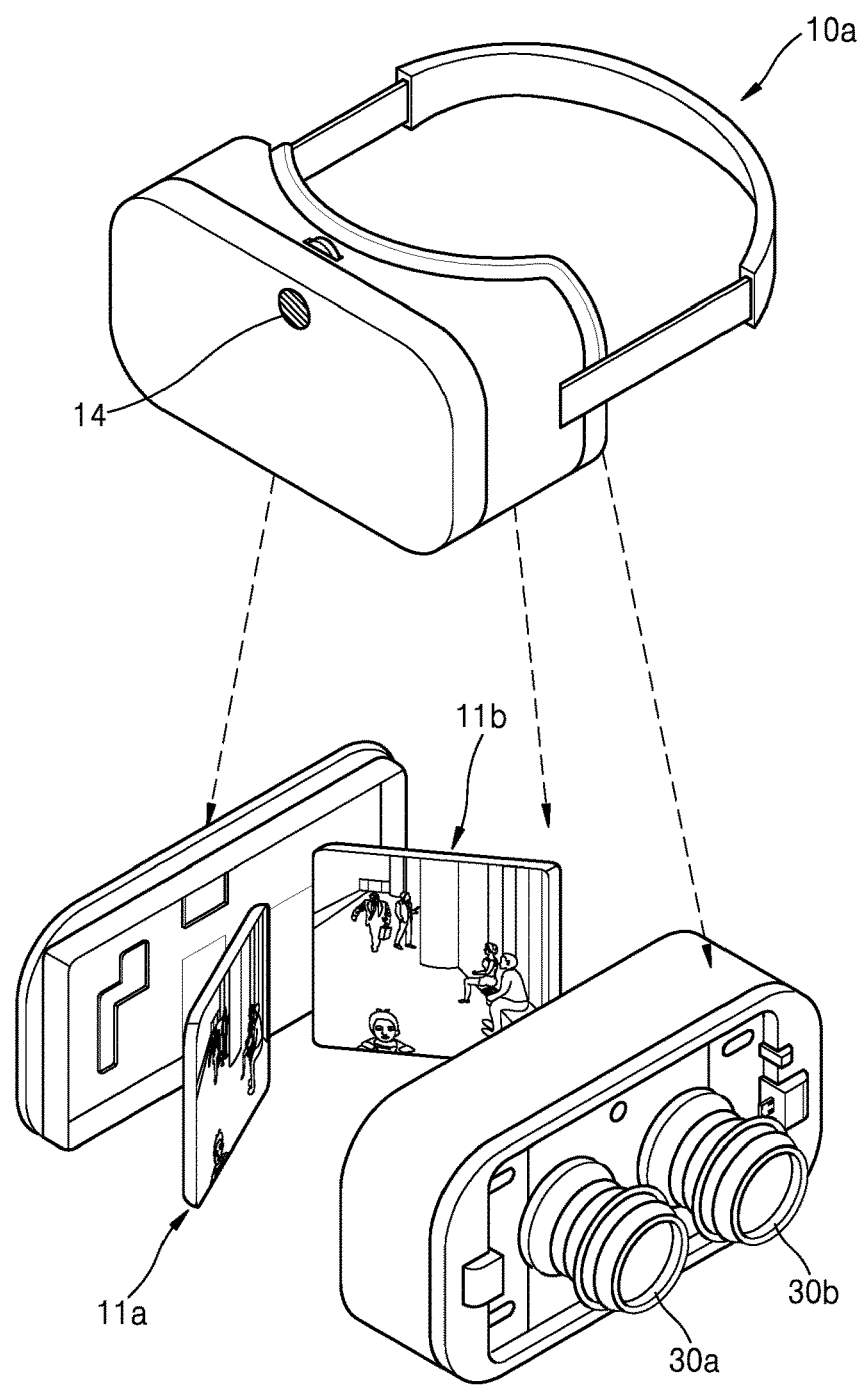

FIGS. 3A and 3B are diagrams of an image display apparatus 10a according to an exemplary embodiment. The image display apparatus 10a of FIGS. 3A and 3B is an example of the image display apparatus 10 of FIG. 1.

Referring to FIG. 3A, the image display apparatus 10a may be an HMD. The display 11 may be provided inside the image display apparatus 10a. Also, the image display apparatus 10a may further include first and second eyepieces 30a and 30b. Accordingly, a user may view an image (e.g., a 360° image, an external image, or an augmented reality image) displayed on the display 11 through the first and second eyepieces 30a and 30b.

The controller 13 may divide the image into a left eye image and a right eye image so as to display a 3D image.

According to an exemplary embodiment, the controller 13 may divide a screen of the display 11 into a first sub-screen 33 and a second sub-screen 35 and control the display 11 to display the left eye image on the first sub-screen 33 and the right eye image on the second sub-screen 35.

According to an exemplary embodiment, as shown in FIG. 3B, when the display 11 includes a plurality of displays, i.e., a first display 11a and a second display 11b, the image display apparatus 10a may locate the first and second displays 11a and 11b respectively collinearly with the first and second eyepieces 30a and 30b. The controller 13 may control the display 11 to display the left eye image on the first display 11a collinear with the first eyepiece 30a, and display the right eye image on the second display 11b collinear with the second eyepiece 30b.

As shown in FIGS. 3A and 3B, the image display apparatus 10a is of a belt type (or helmet type), which can be worn on a head of the user, but is not limited thereto. For example, the image display apparatus 10a may be of a glasses type.

FIG. 4 is a diagram of an image display apparatus 10b according to another exemplary embodiment. The image display apparatus 10b of FIG. 4 is a modification example of the image display apparatus 10 of FIG. 1.

Referring to FIG. 4, the image display apparatus 10b may be a portable apparatus combined with a headset 40. In particular, the image display apparatus 10b may be combined with the headset 40 such that the display 11 faces a body of the headset 40, thereby enabling a user wearing the headset 40 to view an image (e.g., a 360° image, or an augmented reality image) displayed on the display 11 through a lens of the headset 40.

According to an exemplary embodiment, the controller 13 may divide the image into a left eye image and a right eye image, divide the screen of the display 11 into a first sub-screen 43 and a second sub-screen 45, and control the display 11 to display the left eye image on the first sub-screen 43 and display the right eye image on the second sub-screen 45.

Also, even when the user taps the headset 40, the sensor 12 of the image display apparatus 10b may sense a force transferred to the image display apparatus 10b through the headset 40.

Figure 5:
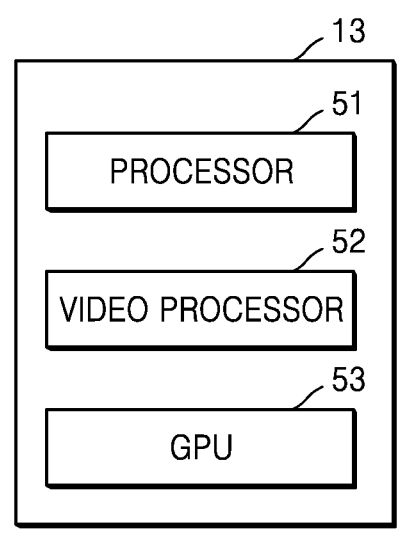
FIG. 5 is a block diagram of a controller according to an exemplary embodiment.

FIG. 5 is a block diagram of the controller 13 according to an exemplary embodiment.

Referring to FIG. 5, the controller 13 may include a processor 51, a video processor 52, and a graphics processing unit (GPU) 53.

The processor 51 may perform operations for controlling the video processor 52 and the GPU 53.

The video processor 52 may perform processes on video data stored in the image display apparatus 10 or on video data received from an external source. The video processor 52 may include a video decoder performing decoding on video data. Also, the video processor 52 may perform various image processes, such as scaling, noise filtering, frame rate conversion, and resolution conversion.

According to an exemplary embodiment, the video processor 52 may obtain a 360° image in a planar form while the image display apparatus 10 is operating in a virtual reality mode, and perform decoding on the 360° image in the planar form.

The GPU 53 may generate a screen including various objects, such as an icon, an image, and text, by using an operator and a renderer. The operator may calculate an attribute value, such as a coordinate value, a shape, a size, or a color, of each object to be displayed according to a layout of the screen. The renderer may generate a screen having any one of various layouts including an object, based on the attribute value calculated by the operator. The screen generated by the renderer may be output to a display region of the display 11.

Figure 6:
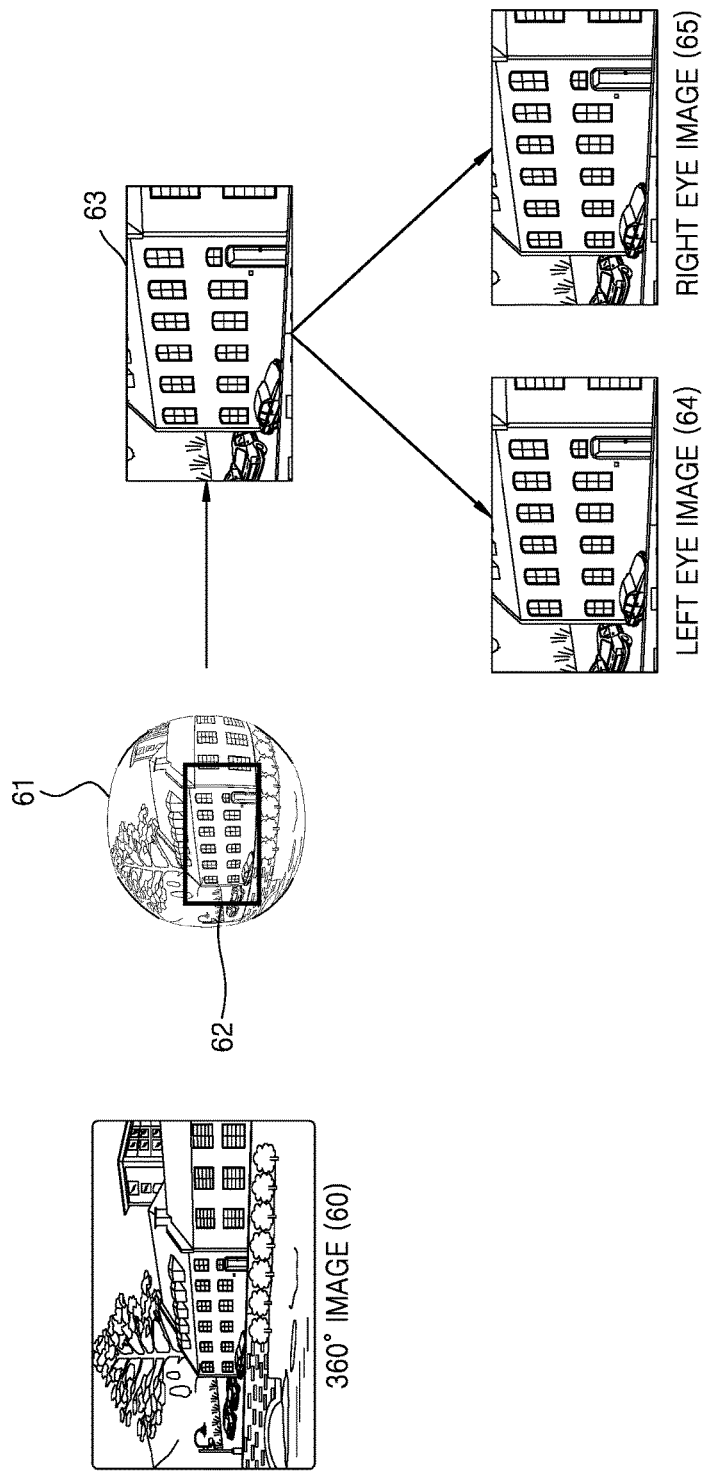
FIG. 6 is a diagram for describing an operation of a graphic processing unit (GPU) in a virtual reality mode, according to an exemplary embodiment.

The GPU 53 according to an exemplary embodiment may warp the 360° image decoded by the video processor 52, while the image display apparatus 10 is operating in the virtual reality mode. In FIG. 6, an operation by which the GPU 53 warps the 360° image is described.

FIG. 6 is a diagram for describing an operation of the GPU 53 in the virtual reality mode, according to an exemplary embodiment.

Referring to FIG. 6, the GPU 53 may warp a 360° image 60 decoded by the video processor 51, and display the 360° image 60 in the display region of the display 11, while the image display apparatus 10 is operating in the virtual reality mode.

For example, the GPU 53 may convert the decoded 360° image 60 to a sphere-shaped 360° image 61. For example, the GPU 53 may map the 360° image 60 in a planar form to a sphere and connect (stitch) contact points of mapped images to generate the sphere-shaped 360° image 61.

Also, the GPU 53 may extract a partial region 62 selected by a user from the sphere-shaped 360° image 61, and display a scaled image 63 according to a display resolution in the display region of the display 11.

According to an exemplary embodiment, the GPU 53 may divide the screen into a first sub-screen and a second sub-screen, and calculate an attribute value of a layout of the first sub-screen and an attribute value of a layout of the second sub-screen. For example, the GPU 53 may divide the screen into the first and second sub-screens by using a side-by-side method or a top-bottom method. However, a method of dividing the screen is not limited thereto, and the GPU 53 may divide the screen into at least two sub-screens by using a line interleaved method or a checker board method.

The GPU 53 may divide the scaled image 63 into a left eye image 64 and a right eye image 65 based on the calculated attribute value and display the left eye image 64 on the first sub-screen and the right eye image 65 on the second sub-screen.

When the 360° image 60 is a left eye-exclusive image, the GPU 53 may obtain a right eye-exclusive 360° image and repeat the above operations to generate a right eye image.

According to an exemplary embodiment, the GPU 53 may move a location of the partial region 62 in the sphere-shaped 360° image 61 according to a value received from the sensor 12. For example, the sensor 12 may sense and provide information about a movement speed and azimuth of the image display apparatus 10 to the controller 13. The GPU 53 may input to the display 11 the partial region 62 of which the location is moved, based on the value received from the sensor 12.

FIG. 7 is a diagram for describing an operation of the controller 13 while the image display apparatus 10 is operating in the live-view mode, according to an exemplary embodiment.

Referring to FIG. 7, while the image display apparatus 10 is operating in the live-view mode, the controller 13 may control the display 11 to display an external image 70 obtained from the imaging device 14, or to display an augmented reality image 72 after adding at least one image or video to the external image 70.

According to an exemplary embodiment, the controller 13 may obtain an image 71 related to the external image 70, from the external image 70. Here, the image 71 (or a video) related to the external image 70 may include at least one of text, an icon, and animation indicating an object included in the external image 70. Also, the image 71 related to the external image 70 may be provided to the controller 13 through a communication unit communicating with an external server. Alternatively, the image 71 related to an identified object may be stored in the memory 15 and provided to the controller 13.

For example, the controller 13 may identify at least one object included in the external image 70, and obtain the image 71 related to the identified at least one object. For example, the controller 13 may extract an edge component in the external image 70 to identify the at least one object included in the external image 70. Also, the controller 13 may add the image 71 related to the identified at least one object to the external image 70, thereby generating the augmented reality image 72.

According to an exemplary embodiment, the controller 13 may process an image signal corresponding to the augmented reality image 72 and display the processed image signal in the display region of the display 11. For example, the GPU 53 may calculate an attribute value (e.g., a coordinate value, a shape, or a size) of the image 71, and the controller 13 may control the display 11 such that the external image 70 and the image 71 are overlappingly output based on the calculated attribute value. In particular, information of places in the image 71 may be laid over the external image 70.

According to an exemplary embodiment, in order to provide the 3D augmented reality image 72, the controller 13 may divide the augmented reality image 72 into a left eye image and a right eye image, and control the display 11 to display the left and right eye images on the screen divided according to a side-by-side method or a top-bottom method.

Figure 8:
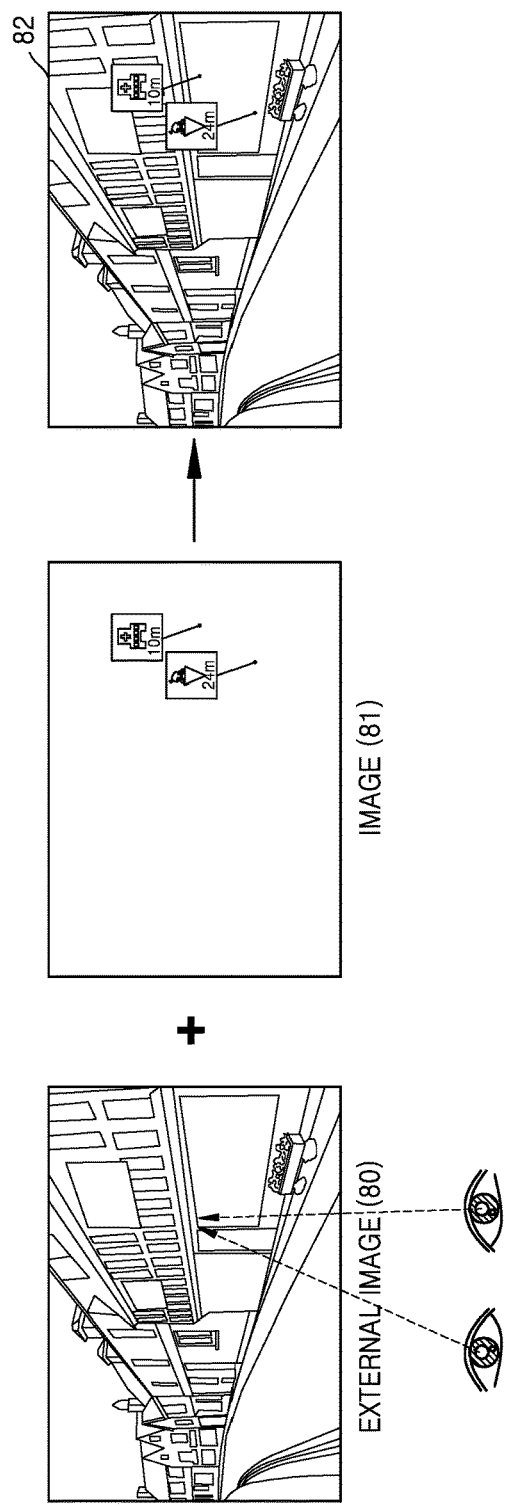
FIG. 8 is a diagram for describing an operation of a controller in a live-view mode, according to another exemplary embodiment.

FIG. 8 is a diagram for describing an operation of the controller 13 while the image display apparatus 10 is operating in the live-view mode, according to another exemplary embodiment.

Referring to FIG. 8, the sensor 12 may further include an infrared sensor that may track an eye of the user. In the live-view mode, the controller 13 may determine a viewing direction of the user by receiving a value sensed by the infrared sensor. Also, the controller 13 may identify an object corresponding to the viewing direction in an external image 80, and generate an augmented reality image 82 by adding, to the external image 80, an image 81 related to the identified object.

According to an exemplary embodiment, the controller 13 may process an image signal corresponding to the augmented reality image 82 and display the processed image signal in the display region of the display 11.

As shown in FIGS. 7 and 8, while the image display apparatus 10 is operating in the live-view mode, the controller 13 generates and/or displays the augmented reality image 72 by using the external image 70 captured according to a video see-through method, but is not limited thereto. For example, when the display 11 is a transparent display, the controller 13 may display, on the transparent display, an image or video related to an external situation, according to an optical see-through method. Accordingly, the user may view an image or video displayed on the transparent display, together with the outside situation.

Figure 9:
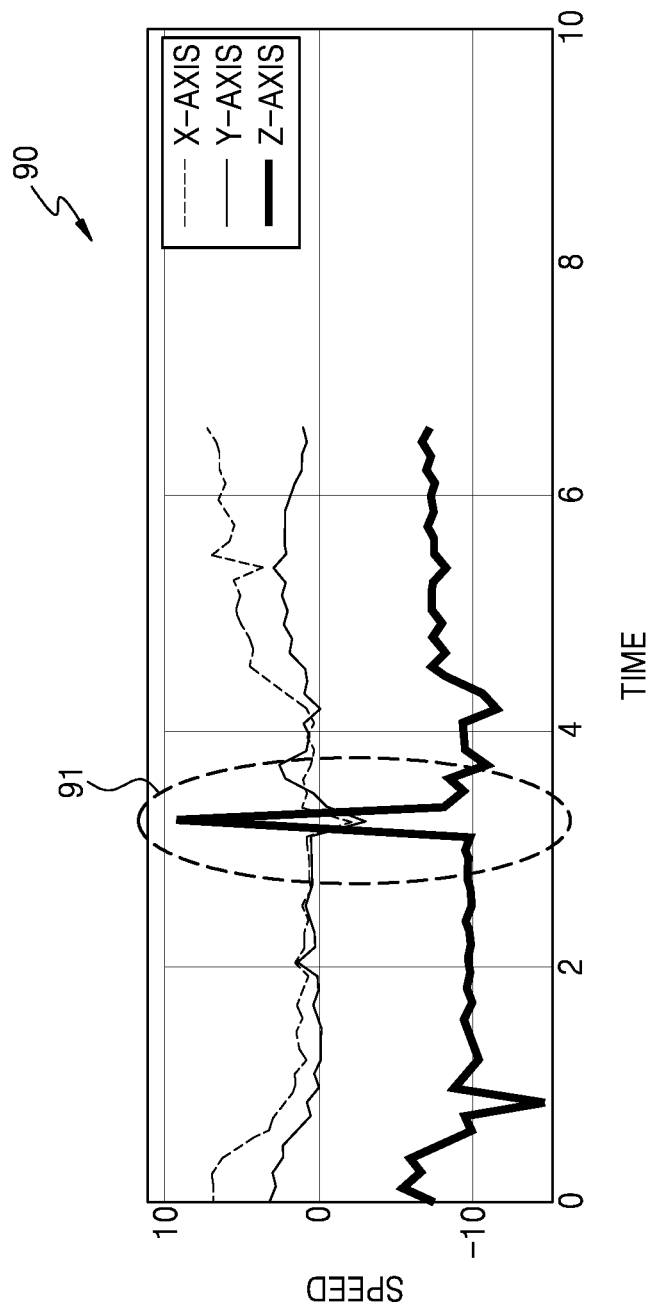
FIG. 9 illustrates an example in which a sensor senses a force applied to an image display apparatus, according to an exemplary embodiment.

FIG. 9 illustrates an example in which the sensor 12 senses a force applied to the image display apparatus 10, according to an exemplary embodiment.

Referring to FIG. 9, the sensor 12 may sense a movement speed of the image display apparatus 10 based on an X-, Y-, and Z-axes by using an acceleration sensor.

According to an exemplary embodiment, the sensor 12 may determine that the force is applied to the image display apparatus 10 when a change of the movement speed corresponding to at least one of the X-, Y-, and Z-axes exceeds a threshold value. For example, the sensor 12 may determine that the force is applied to the image display apparatus 10 when the change of the movement speed corresponding to the Z-axis exceeds the threshold value, as shown in a first hit 91 of FIG. 9.

Figure 10:
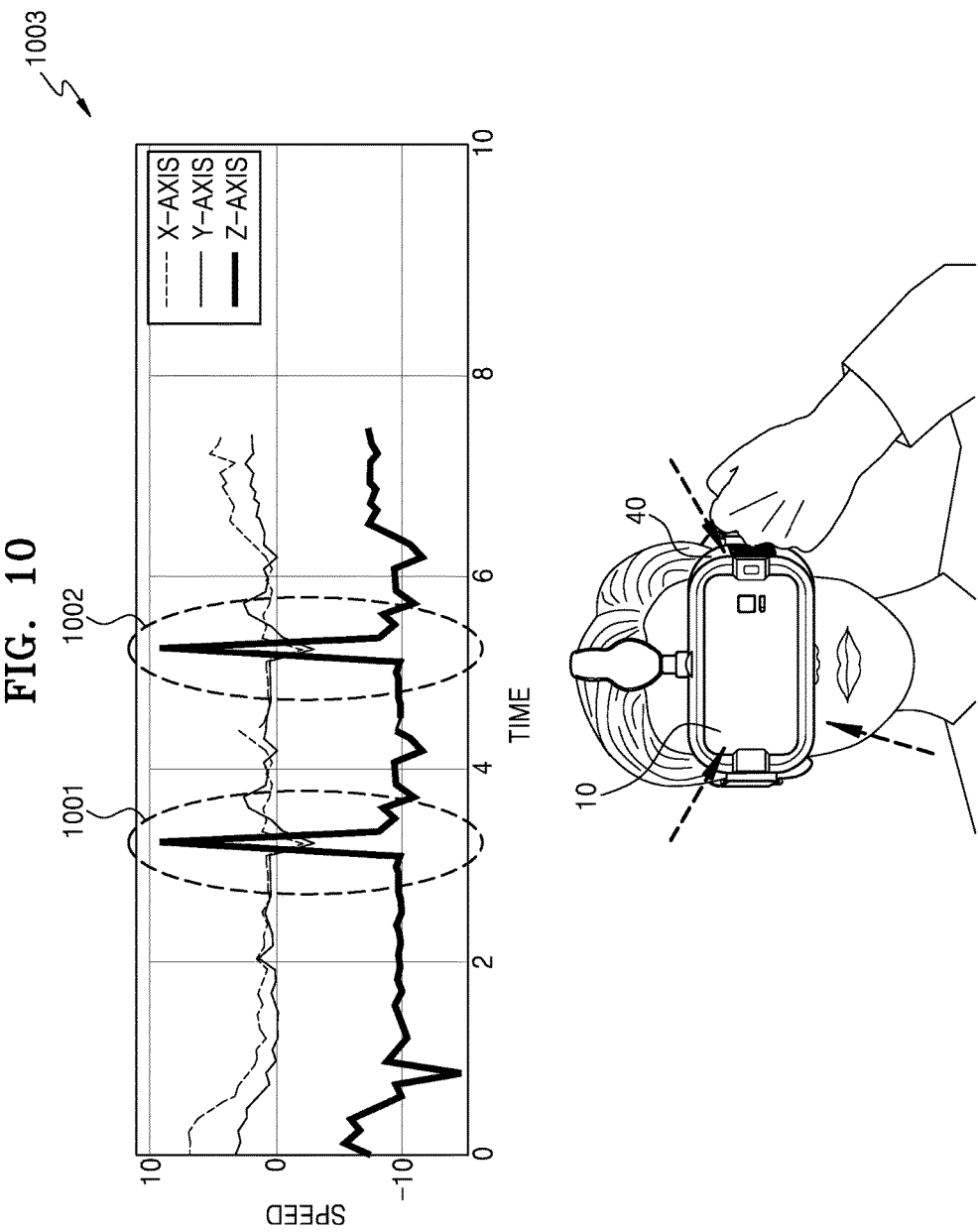
FIG. 10 illustrates an example in which a controller changes an operation mode in response to the sensing of a force applied to an image display apparatus, according to an exemplary embodiment.

FIG. 10 illustrates an example in which the controller 13 changes an operation mode in response to the sensing of a force applied to the image display apparatus 10, according to an exemplary embodiment.

Referring to FIG. 10, the sensor 12 may input, to the controller 13, a control signal indicating that the force is applied to the image display apparatus 10 when a first hit force 1001 applied to the image display apparatus 10 is sensed, and then a second hit force 1002 applied to the image display apparatus 10 is sensed within a pre-set period of time. A hit force may be a force applied to an image display apparatus for a short period of time (e.g., 0.3 seconds).

Accordingly, the user wearing the image display apparatus 10 may continuously tap the image display apparatus 10 (or the headset 40) such that the sensor 12 senses the force applied to the image display apparatus 10. The image display apparatus 10 may distinguish a human touch or tap from an external force not made by a human to avoid an unwanted change of the operation mode. For example, the sensor 12 may sense an alternating current generated when the user's finger comes into contact with the image display apparatus 10, and the controller 13 may determine that the force applied to the image display apparatus 10 is input by the user based on the alternating current.

The user do not have to tap a certain region of the image display apparatus 10, but may tap an arbitrary region (e.g., a region indicated by one of a plurality of arrows in FIG. 10) of the image display apparatus 10 or the headset 40 to apply a force to the image display apparatus 10.

According to an exemplary embodiment, the controller 13 may change the operation mode of the display apparatus 10 from the virtual reality mode to the live-view mode when it is sensed that the force is applied to the image display apparatus 10. Alternatively, the controller 13 may change the operation mode of the display apparatus 10 from the live-view mode to the virtual reality mode when it is sensed that the force is applied to the image display apparatus 10.

Figure 11:
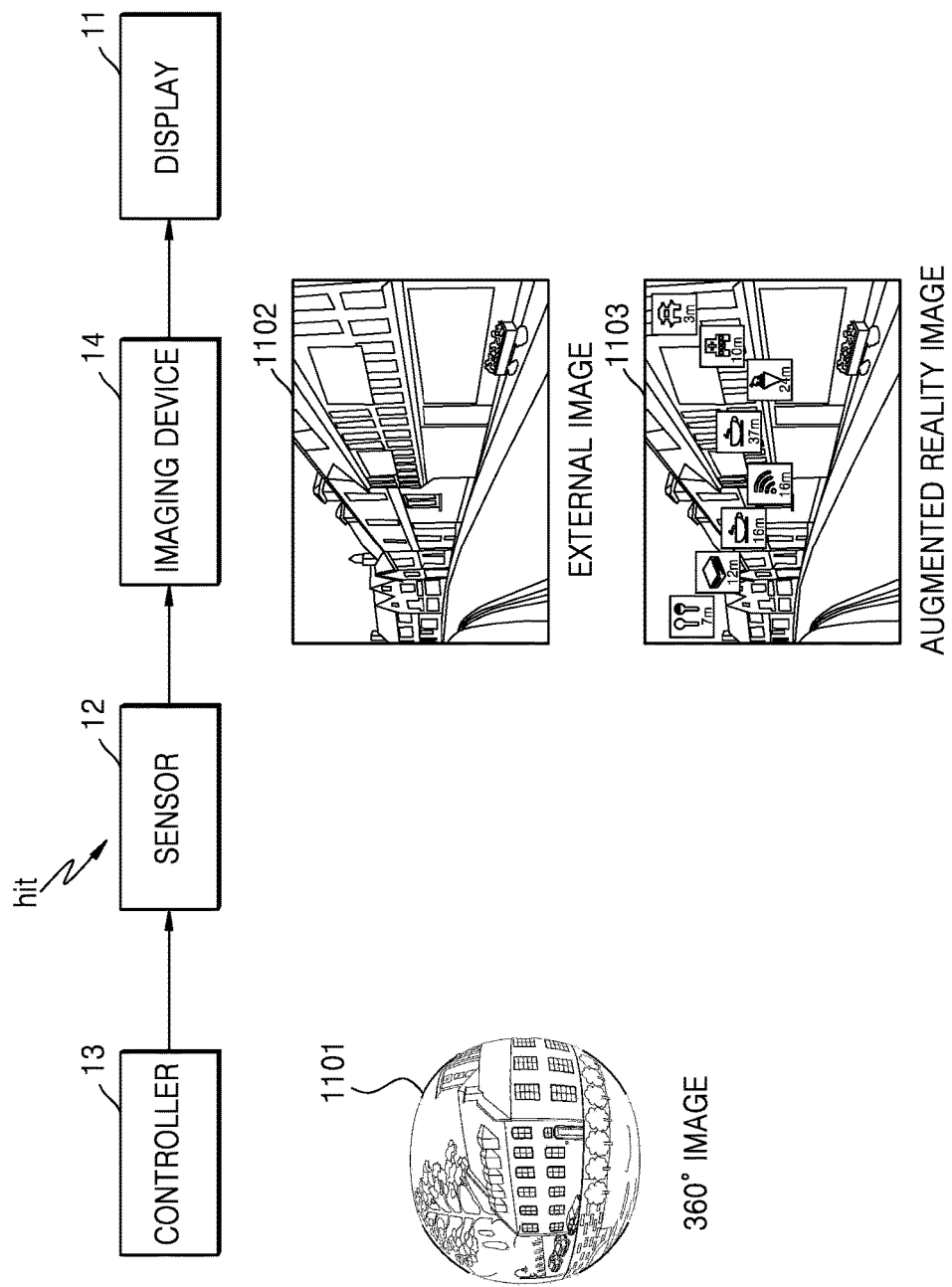
FIG. 11 is a diagram for describing an operation of a controller changing an operation mode, according to an exemplary embodiment.

FIG. 11 is a diagram for describing an operation of the controller 13 changing an operation mode of the display apparatus 10, according to an exemplary embodiment.

Referring to FIG. 11, the controller 13 may change the operation mode of the display apparatus 10 by controlling the display 11, the sensor 12, and the imaging device 14.

For example, the controller 13 may display a 360° image 1101 by controlling the display 11, while operating in the virtual reality mode. Details thereof have been described with reference to FIGS. 5 and 6, and thus are not provided again.

When a signal indicating that a force is applied to the image display apparatus 10 is input from the sensor 12, the controller 13 may activate the imaging device 14. Alternatively, the controller 13 may receive, at regular time intervals, a sensor value sensed by the sensor 12 and determine whether a force is applied to the image display apparatus 10. In particular, the controller 13 may compare the sensor value with a threshold value to determine whether a force is applied to the image display apparatus 10, and when it is determined that a force is applied, the controller 13 may activate the imaging device 14.

When the imaging device 14 is activated, the controller 13 may stop an image signal process performed on the 360° image 1101 and process an image signal corresponding to an external image 1102 captured by the imaging device 14 that operates in the live-view mode.

Also, the controller 13 may generate an augmented reality image 1103 by adding, to the external image 1102, an image related to the external image 1102, and display the augmented reality image 1103 through the display 11. Details thereof have been described with reference to FIGS. 7 and 8, and are not provided again.

Figure 12:
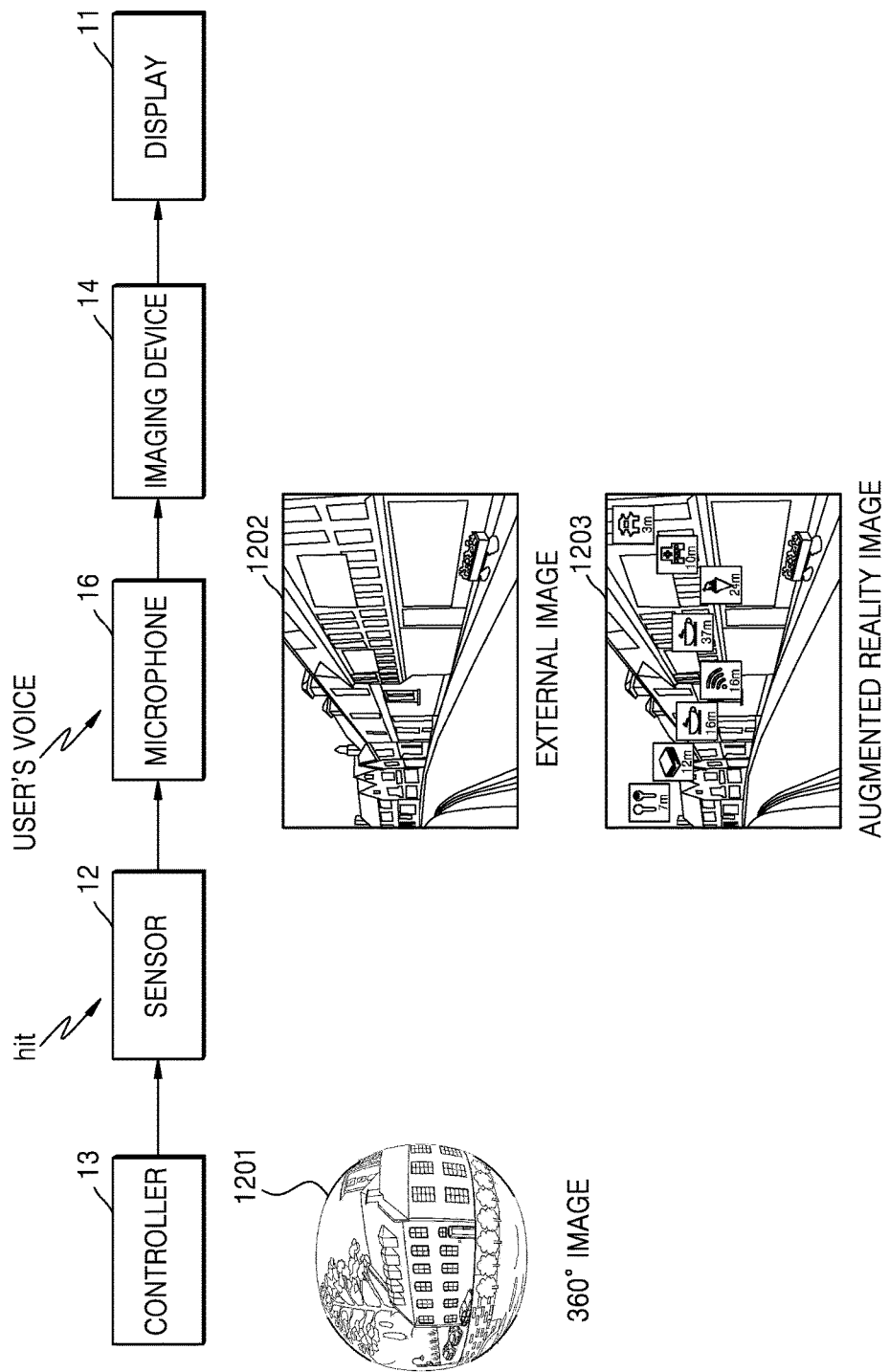
FIG. 12 is a diagram for describing an operation of a controller changing an operation mode, according to another exemplary embodiment.

FIG. 12 is a diagram for describing an operation of the controller 13 changing an operation mode of the display apparatus 10, according to another exemplary embodiment.

Referring to FIG. 12, the image display apparatus 10 may further include a microphone 16. When the sensor 12 senses a force applied to the image display apparatus 10, the controller 13 may activate a voice recognition function to turn on the microphone 16. In particular, as shown in FIG. 9, the sensor 12 may notify the controller 13 of the force being applied to the image display apparatus 10 when the first hit force 91 applied to the image display apparatus 10 is sensed.

The controller 13 according to an exemplary embodiment may change the virtual reality mode of the display apparatus 10 to the live-view mode by analyzing user's voice received through the microphone 16. Accordingly, the display 11 may stop displaying a 360° image 1201 and display an external image 1202 or augmented reality image 1203 according to control of the controller 13.

The controller 13 may change the live-view mode of the display apparatus 10 to the virtual reality mode in response to the sensing of the force applied to the image display apparatus 10. In particular, the controller 13 may deactivate the imaging device 14, process an image signal corresponding to the 360° image 1201 that was previously reproduced, and control the display 11 to display the 360° image 1201.

Figure 13:
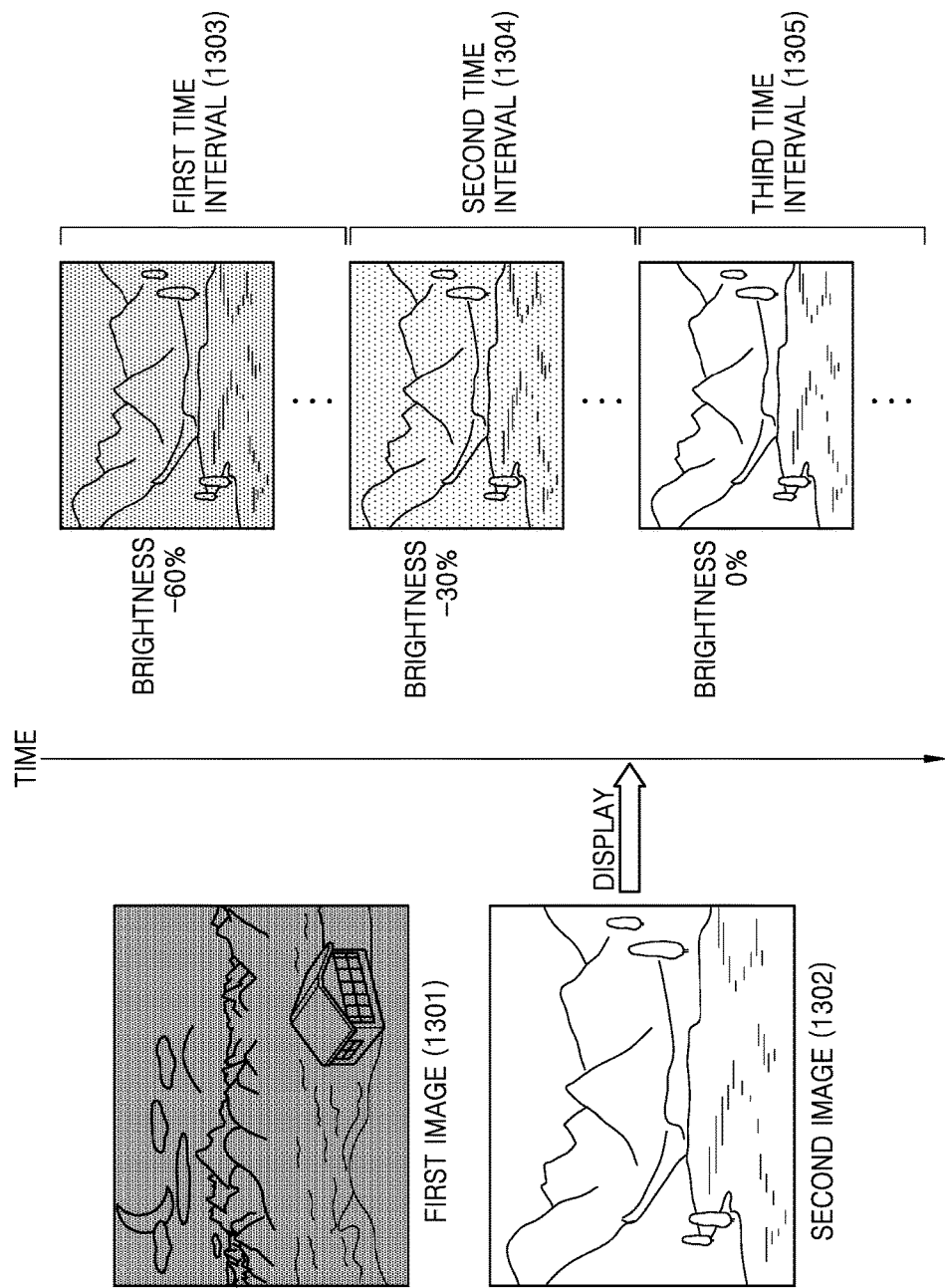
FIG. 13 illustrates an example in which a controller controls a display to display an external image after adjusting brightness of the external image, according to an exemplary embodiment.

FIG. 13 illustrates an example in which the controller 13 controls the display 11 to display an external image after adjusting brightness of the external image, according to an exemplary embodiment.

Referring to FIG. 13, according to an exemplary embodiment, when an operation mode of the display apparatus 10 is changed, the controller 13 may compare brightness of a first image 1301 that was displayed before the operation mode is changed and brightness of a second image 1302 that is to be displayed after the operation mode is changed. When a difference between the brightness of the first image 1301 and the brightness of the second image 1302 is greater than or equal to a threshold value, the controller 13 may control the display 11 to display the second image 1302 after adjusting the brightness of the second image 1302 to correspond to the brightness of the first image 1301.

Then, the controller 13 may gradually adjust the adjusted brightness first image 1301 to be close to the original brightness at pre-set time intervals.

For example, the controller 13 may control the display 11 to display the first image 1301 after adjusting the brightness to −60% for a first time interval 1303, display the first image 1301 after adjusting the brightness to −30% for a second time interval, and display the first image 1301 after adjusting the brightness to the original brightness after a third time interval 1305.

Figure 14:
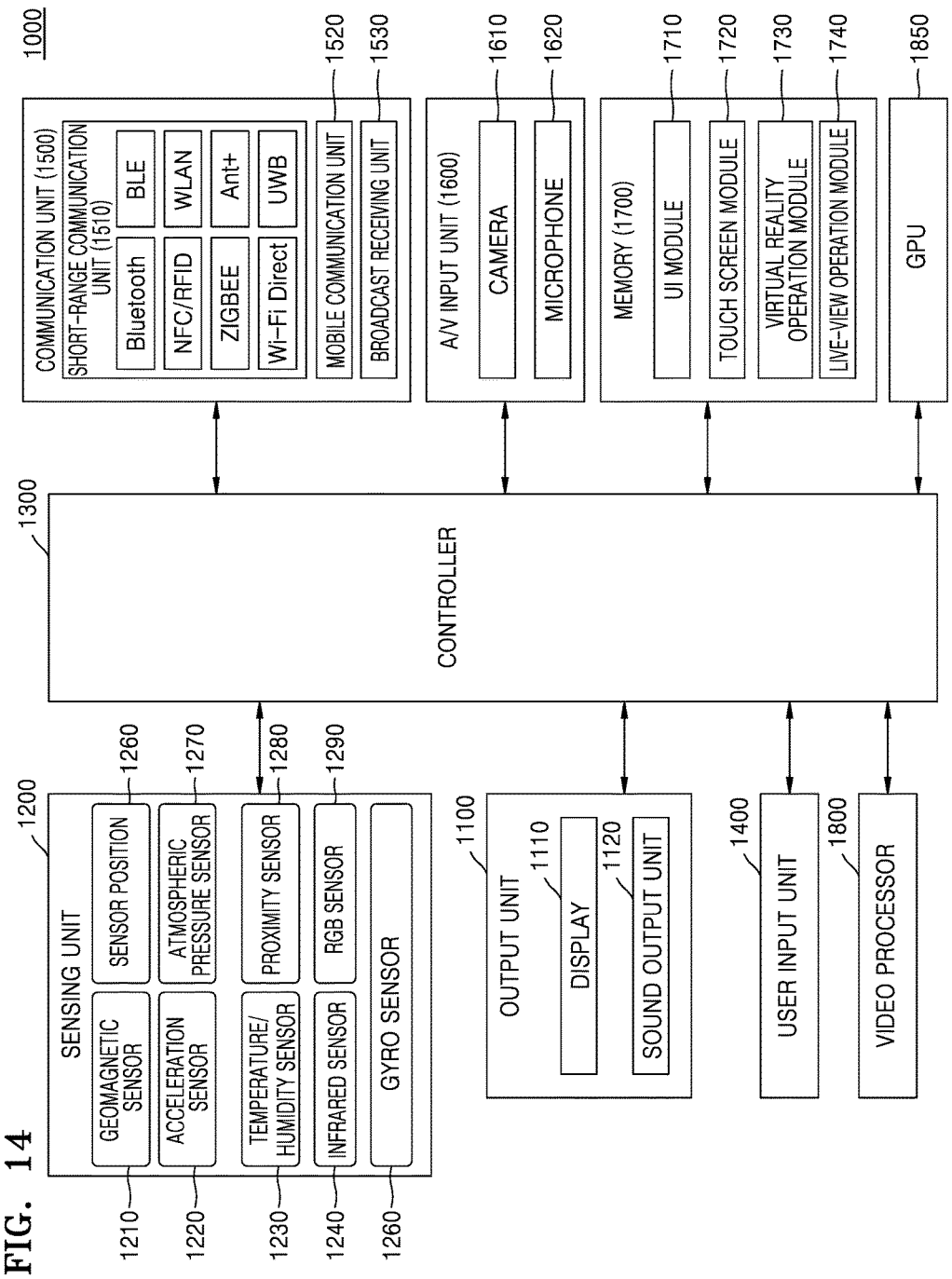
FIG. 14 is a block diagram of a detailed structure of an image display apparatus, according to an exemplary embodiment.

FIG. 14 is a block diagram of a detailed structure of an image display apparatus 1000, according to an exemplary embodiment.

As shown in FIG. 14, the image display apparatus 1000 according to an exemplary embodiment may include a user input unit 1400, a communication unit (e.g., communication interface) 1500, a video processor 1800, and a GPU 1850, in addition to an output unit 1100, a sensor 1200, a controller 1300, an audio/video (A/V) input unit 1600, and a memory 1700.

Details of the output unit 1100, the sensor 1200, and the controller 1300, which overlap those in FIG. 2, will not be provided again. Also, details of the video processor 1800 and the GPU 1850, which overlap those of FIG. 5, will not be provided again. Meanwhile, in FIG. 5, the video processor 1800 and the GPU 1850 are included in the controller 1300, but alternatively, the video processor 1800 and/or the GPU 1850 may be located outside the controller 1300.

The output unit 1100 may output an audio signal, a video signal, or a vibration signal, and may include a display 1110 and a sound output unit 1120.

According to an exemplary embodiment, the display 1110 may output an image signal corresponding to a 360° image, external image, or augmented reality image, according to control of the controller 1300.

When the display 1110 is configured as a touch screen including a layer structure and a touch pad, the display 1110 may also be used as an input device as well as an output device.

The sound output unit 1120 outputs audio data received from the communication unit 1500 or stored in the memory 1700. Also, the sound output unit 1120 outputs a sound signal related to a function performed by the image display apparatus 1000, such as a call signal reception sound, a message reception sound, or an alarm sound.

The sensor 1200 may detect a state of the image display apparatus 1000 or a state around the image display apparatus 1000, and transmit the detected state to the controller 1300. The sensor 1200 may further include at least one of a terrestrial magnetic sensor 1210, a temperature/humidity sensor 1230, an infrared sensor 1240, a position sensor 1260, an atmospheric sensor 1270, and a red, green, blue (RGB) sensor 1290, in addition to an acceleration sensor 1220, a gyroscope sensor 1250, and a proximity sensor 1280 described with reference to FIG. 2.

The controller 1300 controls overall operations of the image display apparatus 1000 by including at least one processor. The controller 1300 controls a signal flow between internal components of the image display apparatus 1000, and processes data. The controller 1300 may execute an operating system (OS) or various applications stored in the memory 1700 when a user input is received or a pre-set condition is satisfied.

According to an exemplary embodiment, the controller 1300 may execute various operation modes, and change the operation mode according to a sensor value received from the sensor 1200.

The user input unit 1400 may receive a user input for controlling the image display apparatus 1000. Examples of the user input unit 1400 include a keypad, a dome switch, a touch pad (a touch capacitance type, a pressure resistance film type, an infrared light detecting type, a surface ultrasound conducting type, an integral tension measuring type, or a piezo-effect type), a jog wheel, and a jog switch, but are not limited thereto.

The communication unit 1500 may include at least one component enabling the image display apparatus 1000 to communicate with an external device. For example, the communication unit 1500 may include at least one of a short-range communication unit 1510, a mobile communication unit 1520, and a broadcast receiving unit 1530.

The short-range communication unit 1510 may include a Bluetooth communication unit, a Bluetooth low energy (BLE) communication unit, a near-field communication (NFC) unit, a wireless local area network (WLAN) (Wi-Fi) communication unit, a ZigBee communication unit, an infrared data association (IrDA) communication unit, a Wi-Fi direct (WFD) communication unit, an ultra-wideband (UWB) communication unit, and an Ant+ communication unit, but components included in the short-range communication unit 1510 are not limited thereto, and the short-range communication unit 1510 may further include a new component according to technology development.

The mobile communication unit 1520 transmits and receives a wireless signal to and from at least one of a base station, an external terminal, and a server, on a mobile communication network.

The broadcast receiving unit 1530 receives a broadcast signal and/or broadcast related information from an external source, through a broadcast channel. The broadcast channel may include a satellite channel or a terrestrial broadcasting channel.

The A/V input unit 1600 receives an audio signal or a video signal, and may include a camera 1610 and a microphone 1620. The camera 1610 may obtain an image frame of a still image or a moving image via an image sensor in a video telephone mode or a live-view mode. An image captured via the image sensor may be processed by the controller 1300 or the GPU 1850. The image display apparatus 1000 may include two or more cameras 1610 according to an embodiment. Meanwhile, the camera 1610 may correspond to the imaging device 14 of FIG. 2.

The microphone 1620 receives an external sound signal and processes the external sound signal to electric voice data. The microphone 1620 may use any one of various noise removing algorithms to remove noise generated while receiving the external sound signal.

The memory 1700 may store programs for processes and controls of the controller 1300, and may store data input to or output from the image display apparatus 1000.

Programs stored in the memory 1700 may be classified into a plurality of modules based on functions, and may be classified into a user interface (UI) module 1710, a touch screen module 1720, a virtual reality operation module 1730, and a live-view operation module 1740.

The UI module 1710 may provide a specialized UI or graphic user interface (GUI) linked to the image display apparatus 1000 according to applications. The touch screen module 1720 may detect a touch gesture of a user on a touch screen, and transmit information about the touch gesture to the controller 1300. The touch screen module 1720 may be configured as separate hardware including a controller.

The virtual reality operation module 1730 may provide at least one command, i.e., at least one instruction, for the controller 1300 to operate in a virtual reality mode. For example, the virtual reality operation module 1730 may include commands for deactivating the camera 1610 and performing image processes on a 360° image. When the operation mode is changed from the live-view mode to the virtual reality mode, the controller 1300 may turn off the camera 1610 to save battery power on the image display apparatus 1000.

The live-view operation module 1740 may provide at least one command for the controller 1300 to operate in a live-view mode. For example, the live-view operation module 1740 may include commands for activating the camera 1610 and performing image processes on an external image captured by the camera 1610. Also, the live-view operation module 1740 may include commands for obtaining an image or video related to the external image, and adding the image or video to the external image.

The video processor 1800 performs various image processes, such as decoding, scaling, and noise-filtering, on video data. The GPU 1850 generates a screen to be output to a display region of the display 1110 by rendering an image signal.

FIGS. 15 through 18 are flowcharts of methods of operating the image display apparatus 10, according to exemplary embodiments. The methods of FIGS. 15 through 18 are related to exemplary embodiments described with reference to FIGS. 1 through 14. Accordingly, details described with reference to FIGS. 1 through 14 may be applied to the methods of FIGS. 15 through 18 even if omitted.

Figure 15:
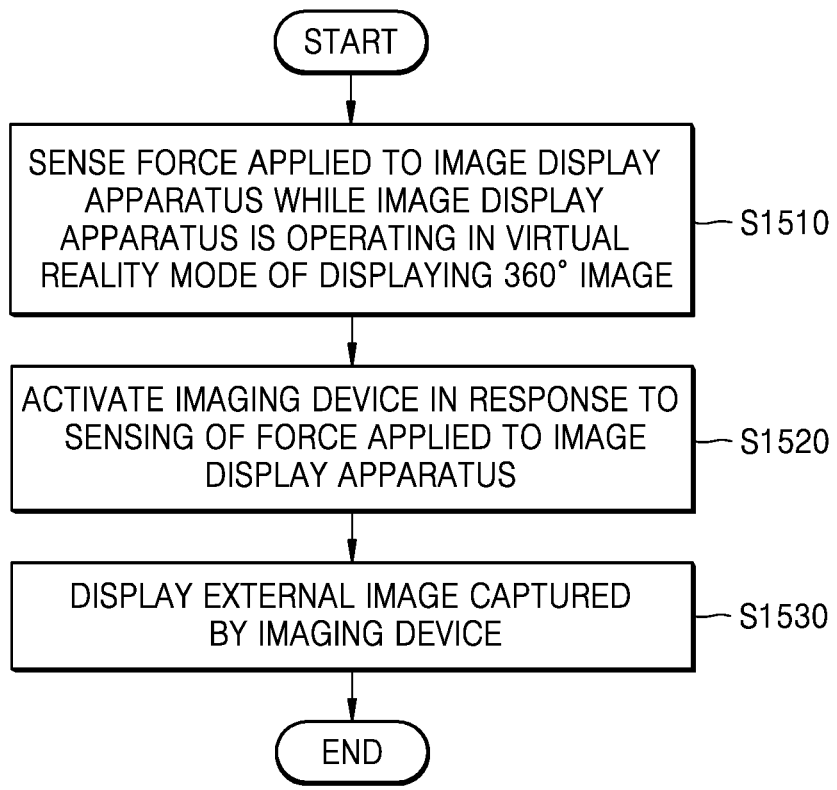
FIG. 15 is a flowchart of an operating method of an image display apparatus, according to an exemplary embodiment.

FIG. 15 is a flowchart of an operating method of the image display apparatus 10, according to an exemplary embodiment.

Referring to FIG. 15, in operation S1510, the image display apparatus 10 senses force applied thereto, while operating in a virtual reality mode of displaying a 360° image.

According to an exemplary embodiment, the image display apparatus 10 may operate in the virtual reality mode. In the virtual reality mode, the image display apparatus 10 may process and display, on a screen, an image signal corresponding to the 360° image. For example, the image display apparatus 10 may obtain a 360° image in a planar form and map the 360° image to a sphere to generate a sphere-shaped 360° image, and extract and display, on the screen, a partial region of the sphere-shaped 360° image.

Meanwhile, the image display apparatus 10 may move a location of the partial region of the sphere-shaped 360° image displayed on the screen when movement of a user is sensed.

According to an exemplary embodiment, the image display apparatus 10 may sense information about a movement speed of the image display apparatus 10 and/or information about an azimuth to determine whether the force is applied to the image display apparatus 10.

For example, the image display apparatus 10 may sense the movement speed, and when a change of the sensed movement speed exceeds a threshold value, determine that the force is applied to the image display apparatus 10. Alternatively, the image display apparatus 10 may sense the azimuth of the image display apparatus 10, and when a change of the sensed azimuth exceeds a threshold value, determine that the force is applied to the image display apparatus 10.

In operation S1520, the image display apparatus 10 activates an imaging device (e.g., camera) 14 in response to the sensing of the force applied to the image display apparatus 10.

According to an exemplary embodiment, the image display apparatus 10 may change the virtual reality mode to a live-view mode in response to the sensing of the force applied to the image display apparatus 10. When the operation mode is changed to the live-view mode, the image display apparatus 10 may activate the imaging device 14.

In operation S1530, the image display apparatus 10 displays an external image captured by the imaging device 14.

According to an exemplary embodiment, when the operation mode is changed to the live-view mode, the image display apparatus 10 may process an image signal corresponding to the external image captured by the imaging device 14, and display the processed image signal on a screen.

Also, the image display apparatus 10 may generate an augmented reality image by adding, to the external image, an image or video related to the external image. The image display apparatus 10 may process an image signal corresponding to the augmented reality image, and display the processed image signal on the screen.

According to an exemplary embodiment, in response to the sensing of the force applied to the image display apparatus 10 while the display apparatus 10 is operating in the live-view mode, the image display apparatus 10 may change it operation mode back to the virtual reality mode. In particular, the image display apparatus 10 may deactivate the imaging device 14 and continuously display the 360° image that was being reproduced.

When the operation mode of the display apparatus 10 is changed, the image display apparatus 10 may adjust brightness of an image to be displayed on the screen in the changed operation mode, based on brightness of an image displayed on the screen in the previous operation mode.

Also, hereinabove, the image display apparatus 10 displays the augmented reality image in the live-view mode, but may individually operate in the live-view mode of displaying the external image and in an augmented reality mode of displaying the augmented reality image. In particular, the image display apparatus 10 may change the operation mode to the augmented reality mode in response to the sensing of the force applied to the image display apparatus 10 while operating in the live-view mode.

Figure 16:
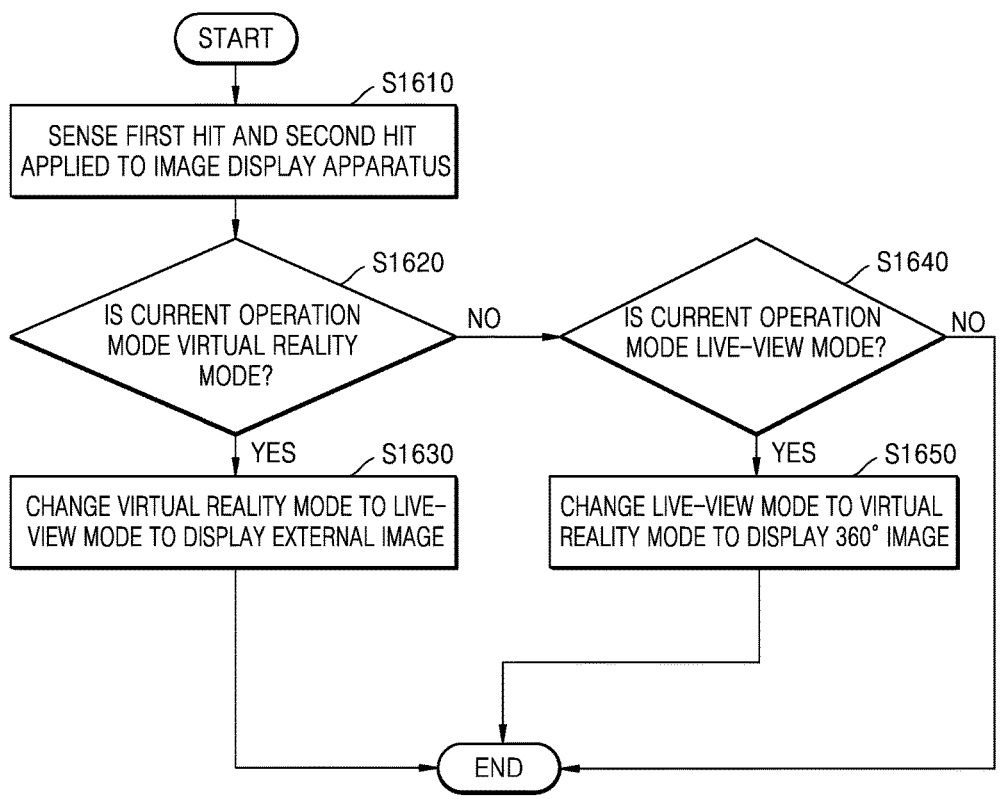
FIG. 16 is a flowchart of a method used by an image display apparatus to change an operation mode, according to an exemplary embodiment.

FIG. 16 is a flowchart of a method used the image display apparatus 10 to change an operation mode, according to an exemplary embodiment.

Referring to FIG. 16, in operation S1610, the image display apparatus 10 may sense a first hit and a second hit applied to the image display apparatus 10. Here, a hit may be force applied to an image display apparatus for a short period of time, for example, for 0.3 seconds. For example, when a user lightly taps the image display apparatus 10, the image display apparatus 10 may sense a hit.

According to an exemplary embodiment, the image display apparatus 10 may determine whether the first and second hits are generated by sensing a change of a movement speed and/or a change of an azimuth of the image display apparatus 10. Also, when the first and second hits are generated, the image display apparatus 10 may determine that force is applied to the image display apparatus 10, and change the operation mode.

In operation S1620, the image display apparatus 10 may determine whether the current operation mode is a virtual reality mode. When it is determined that the current operation mode is the virtual reality mode, the image display apparatus 10 may change the operation mode from the virtual reality mode to a live-view mode and display an external image in operation S1630.

According to an exemplary embodiment, the image display apparatus 10 may display the external image and/or an image or video related to the external image.

When it is determined that the current operation mode is not the virtual reality mode, the image display apparatus 10 may determine whether the current operation mode is the live-view mode in operation S1640. When it is determined that the current operation mode is the live-view mode, the image display apparatus 10 may change the live-view mode to the virtual reality mode and display a 360° image in operation S1650.

When it is determined that the operation mode is neither the virtual reality mode nor the live-view mode, the image display apparatus 10 may not change the operation mode even when force applied to the image display apparatus 10 is sensed.

Also, according to an exemplary embodiment, the image display apparatus 10 may not change the operation mode even when force is applied to the image display apparatus, when a user is not wearing the image display apparatus 10.

Meanwhile, in FIG. 16, the operation mode of the image display apparatus 10 is determined after a force applied to the image display apparatus 10 is sensed, but the exemplary embodiment is not limited thereto. For example, the image display apparatus 10 may determine whether a force is applied thereto only when operating in the virtual reality mode or the live-view mode. In this case, operations S1620 and S1640 may not be performed.

Figure 17:
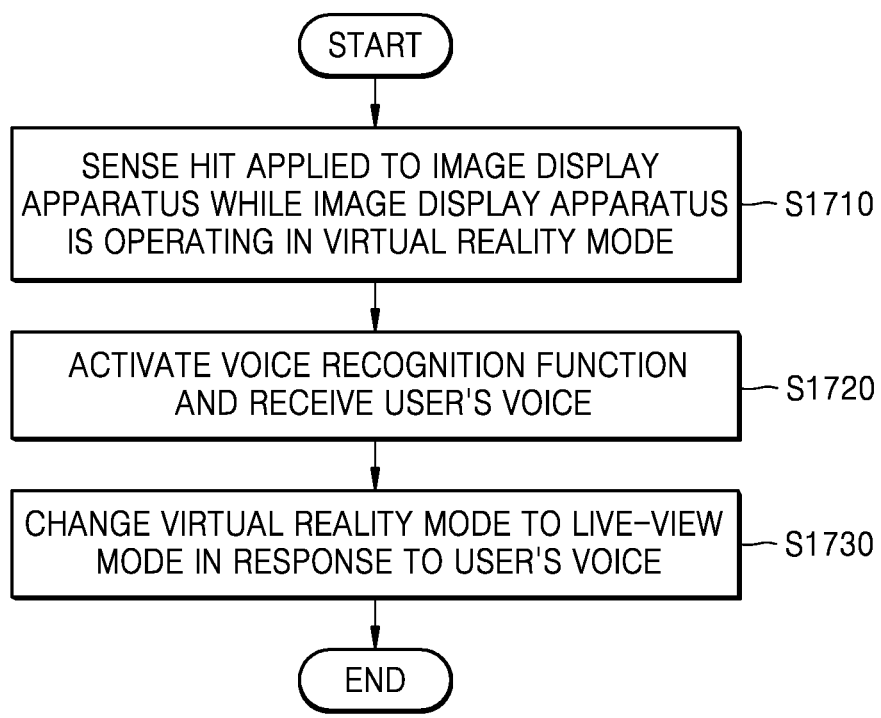
FIG. 17 is a flowchart of a method used by an image display apparatus to change an operation mode, according to another exemplary embodiment.

FIG. 17 is a flowchart of a method used by the image display apparatus 10 to change an operation mode, according to another embodiment.

Referring to FIG. 17, the image display apparatus 10 may sense a hit applied to the image display apparatus 10 while operating in a virtual reality mode, in operation S1710.

In operation S1720, the image display apparatus 10 may activate a voice recognition function and receive user's voice when the hit is sensed.

In operation S1730, the image display apparatus 10 may change the virtual reality mode to a live-view mode in response to the user's voice. Accordingly, the image display apparatus 10 may change a 360° image displayed on a screen to an external image captured by an imaging device 14.

Alternatively, according to another exemplary embodiment, the image display apparatus 10 may perform another operation in response to the user's voice. For example, the image display apparatus 10 may not change its operation mode, but may display a main menu screen of the virtual reality mode or control the 360° image (e.g., fast forward, rewind, or replay), in response to the user's voice.

Figure 18:
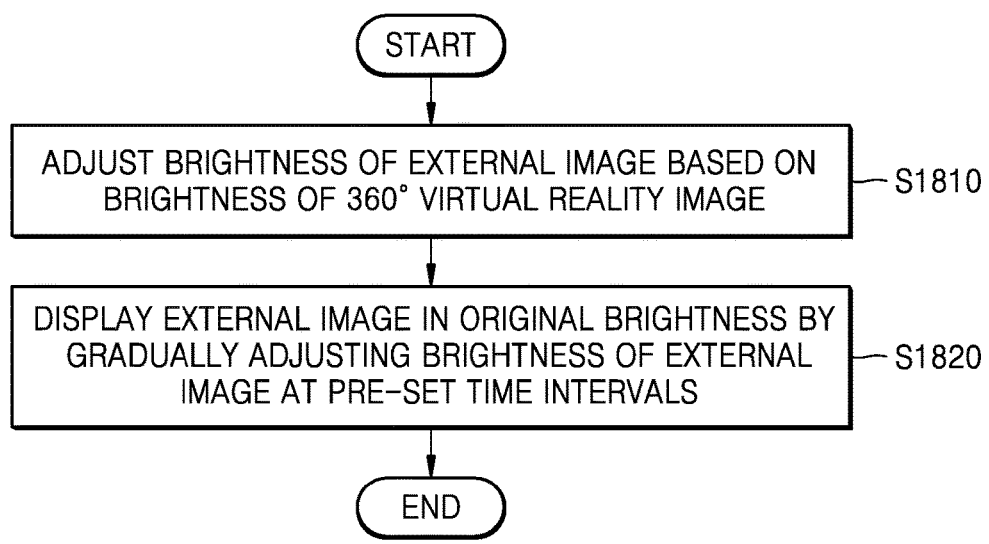
FIG. 18 is a flowchart of a method used by an image display apparatus to adjust brightness of an image displayed on a screen when an operation mode of the image display apparatus is changed, according to an exemplary embodiment.

FIG. 18 is a flowchart of a method used by the image display apparatus 10 to adjust brightness of an image displayed on a screen when an operation mode of the image display apparatus 10 is changed, according to an exemplary embodiment.

Referring to FIG. 18, in operation S1810, the image display apparatus 10 may adjust brightness of an external image based on brightness of a 360° virtual reality image when a virtual reality mode is changed to a live-view mode. Accordingly, brightness of an image displayed to a user may be prevented from being suddenly increased or reduced.

According to an exemplary embodiment, the image display apparatus 10 may adjust the brightness of the external image according to the brightness of the 360° virtual reality image.

In operation S1820, the image display apparatus 10 may change and display the external image to the original brightness by gradually adjusting the brightness of the external image at pre-set time intervals.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or specialpurpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image display apparatus comprising:
    an imaging device;
    a display;
    a sensor configured to sense an external force exerted to the image display apparatus when a touch or a tab is made on the image display apparatus; and
    a processor configured to:
    control the display to display a portion of a 360° image in a virtual reality mode, and
    in response to the external force greater than a threshold external force being sensed while the image display apparatus is operating in the virtual reality mode, activate the imaging device and change an operating mode of the image display apparatus from the virtual reality mode to live-view mode to display an external image captured by the activated imaging device on the display.

2. The image display apparatus of claim 1, wherein the processor is further configured to change the live-view mode to the virtual reality mode in response to the external force being sensed in the live-view mode, and a strength of the external force being greater than the threshold external force.

3. The image display apparatus of claim 1,
    wherein the sensor includes an acceleration sensor configured to sense a strength of the external force exerted to the image display apparatus based on a movement speed of the image display apparatus when the touch or the tab is made on the image display apparatus,
    wherein the touch or the tab comprises a first hit and a second hit which occurs subsequent to the first hit, and
    wherein the processor is further configured to determine a time difference between a first point in time when the first hit occurs and a second point in time when the second hit occurs, and change the virtual reality mode to the live-view mode in response to the time difference being within a pre-set period.

4. The image display apparatus of claim 1, wherein the processor is further configured to activate a voice recognition function to receive voice from a user in response to the external force being sensed, and activate the imaging device in response to the voice being received from the user.

5. The image display apparatus of claim 1, wherein the sensor is further configured to measure a movement speed of the image display apparatus, and
    the processor is configured to determine whether the external force is applied to the image display apparatus by comparing a threshold value corresponding to the threshold external force with a change of the movement speed.

6. The image display apparatus of claim 1, wherein the processor is further configured to add to the external image a still image or video related to at least one object included in the external image, and control the display to display the external image to which the still image or video has been added.

7. The image display apparatus of claim 1, wherein the processor is further configured to:
    divide each of the 360° image and the external image into a left eye image and a right eye image; and
    control the display to divide a screen of the display into a first sub-screen and a second sub-screen, to display the left eye image of the 360° image and the left eye image of the external image on the first sub-screen, and to display the right eye image of the 360° image and the right eye image of the external image on the second sub-screen.

8. The image display apparatus of claim 1, wherein the processor is further configured to control the display to adjust brightness of the external image based on brightness of the 360° image.

9. The image display apparatus of claim 8, wherein the brightness of the external image is adjusted to be gradually close to original brightness of the external image at pre-set time intervals.

10. The image display apparatus of claim 1, wherein the processor is further configured to generate a sphere-shaped 360° image by mapping the 360° image to a sphere, to extract a partial region of the sphere-shaped 360° image based on a movement of the image display apparatus, and to control the display to display the extracted partial region.

11. The image display apparatus of claim 10, further comprising a graphic processing unit (GPU) configured to warp the extracted partial region,
    wherein the processor is further configured to control the display to display the partial region warped by the GPU.

12. An operating method of an image display apparatus, the operating method comprising:
    displaying a portion of a 360° image in a virtual reality mode;
    sensing an external force exerted to the image display apparatus when a touch or a tab is made on the image display apparatus;
    in response to the external force greater than a threshold external force being sensed while the image display apparatus is operating in the virtual reality mode, activating an imaging device;
    capturing an external image by the activated imaging device; and
    in response to a strength of the external force which is greater than the threshold external force being sensed during the virtual reality mode, changing the virtual reality mode of displaying a 360° image to a live-view mode of displaying the external image captured by the activated imaging device on a display of the image display apparatus.

13. The operating method of claim 12, further comprising:
    changing the live-view mode to the virtual reality mode in response to the external force being sensed, and the strength of the external force being greater than the threshold external force.

14. The operating method of claim 12, wherein the sensing the external force comprises:
    sensing the strength of the external force exerted to the image display apparatus based on a movement speed of the image display apparatus when the touch or the tab is made on the image display apparatus in the virtual reality mode, wherein the touch or the tab includes a first hit and a second hit which occurs subsequent to the first hit, and wherein the changing the virtual reality mode to the live-view mode comprises:

determining a time difference between a first point in time when the first hit occurs and a second point in time when the second hit occurs; and changing the virtual reality mode to the live-view mode in response to the time difference being within a pre-set period of time.

15. The operating method of claim 12, wherein the activating the imaging device comprises:

activating a voice recognition function in response to the external force being sensed;

receiving voice from a user of the image display apparatus; and activating the imaging device in response to the voice received from the user.

16. The operating method of claim 12, wherein the sensing the external force comprises:

measuring a movement speed of the image display apparatus; and determining whether the external force is applied to the image display apparatus by comparing a threshold value corresponding to the threshold external force with a change of the measured movement speed.

17. The operating method of claim 12, wherein the changing the virtual reality mode to the live-view mode comprises:

adding, to the external image, an image related to at least one object included in the external image; and displaying the external image to which the image has been added.

18. A non-transitory computer-readable storage medium storing a program that is executable by a computer to perform the operating method of claim 12.

19. A method for changing a view mode, the method comprising:

receiving an input indicating that a touch is made to an image display apparatus while the image display apparatus is operating in a virtual reality mode;

determining a strength of the human-touch based on a movement of the image display apparatus that occurs when the human-touch is made; and activating an imaging device to capture and display an external image in response to the strength of the touch is greater than a threshold value.

20. The method of claim 19, further comprising:

in response to a difference between a brightness level of a virtual reality image which has been reproduced in the virtual reality mode and a brightness level of the external image which is to be reproduced is greater than or equal to a predetermined value, adjusting the brightness level of the external image to reduce the difference to be less than the predetermined value.

* * * * *